US006935693B2

(12) United States Patent
Janscha et al.

(10) Patent No.: US 6,935,693 B2
(45) Date of Patent: Aug. 30, 2005

(54) SEAT SUSPENSION

(75) Inventors: Ryan Derrick Janscha, Brookfield, WI (US); Kevin Earl Hill, Mequon, WI (US); Dean Davis-Troller, Brookfield, WI (US); Bradley S. Boyles, Mequon, WI (US); John Kucharski, Brown Deer, WI (US)

(73) Assignee: Milsco Manufacturing, a Unit of Jason Incorporated, Milwaukee, WI (US)

( * ) Notice: Subject to any disclaimer, the term of this patent is extended or adjusted under 35 U.S.C. 154(b) by 163 days.

(21) Appl. No.: 10/393,842

(22) Filed: Mar. 21, 2003

(65) Prior Publication Data

US 2003/0201660 A1 Oct. 30, 2003

Related U.S. Application Data

(60) Provisional application No. 60/366,965, filed on Mar. 22, 2002.

(51) Int. Cl.[7] .............................................. F16M 13/00
(52) U.S. Cl. ........................... 297/344.15; 297/344.12; 248/550; 248/564; 248/577
(58) Field of Search ........................... 297/338, 344.12, 297/344.15, 325; 248/421, 550, 564, 577

(56) References Cited

U.S. PATENT DOCUMENTS

| 3,390,857 | A | * | 7/1968 | Gosta ......................... 248/564 |
| 3,826,457 | A | * | 7/1974 | Huot de Longchamp ... 248/564 |
| 3,917,211 | A | | 11/1975 | Daunderer et al. |
| 4,125,242 | A | | 11/1978 | Meiller et al. |
| 4,158,160 | A | | 6/1979 | Meiller |
| 4,183,492 | A | | 1/1980 | Meiller |
| 4,364,605 | A | | 12/1982 | Meiller |
| 4,397,501 | A | | 8/1983 | Meiller et al. |

(Continued)

FOREIGN PATENT DOCUMENTS

| DE | 470585 | 1/1929 |
| DE | 41 27 274 A1 | 2/1993 |
| DE | 195 44 002 A1 | 5/1997 |
| DE | 196 46 304 A1 | 2/1998 |
| DE | 197 01 363 C1 | 8/1998 |
| DE | 298 11 760 | 7/1999 |
| DE | 199 02 224 C1 | 4/2000 |
| DE | 100 57 993 C1 | 12/2001 |
| DE | 100 39 042 A1 | 2/2002 |
| DE | 100 39 501 A1 | 2/2002 |
| DE | 100 40 696 A1 | 3/2002 |
| EP | 0 457 420 A2 | 11/1991 |
| EP | 0 665 131 A1 | 8/1995 |

(Continued)

OTHER PUBLICATIONS

MSG 20 Compact Seat with Rapid Weight Adjustment for Forklifts and Small Construction Machines brochure, Grammer, undated.

Primary Examiner—Peter R. Brown
(74) Attorney, Agent, or Firm—Boyle, Fredrickson, Newholm Stein & Gratz, S.C.

(57) ABSTRACT

A suspension for a seat that varies the preload, spring rate and damping rate of the suspension in direct proportion to the suspended weight of an occupant of the seat to provide the same effective vibration isolation for any occupant. The suspension includes an actuating mechanism engaged with a first spring and a pivotal transfer link that is engaged with a second spring and a non-adjustable rate damper that are each fixedly attached to the seat opposite the transfer link. The transfer link is engaged with a weight adjustment mechanism which operates to adjust the position of a pivot pin for the transfer link with respect to the transfer link, such that the preload, spring rate and damping rate of the suspension are adjusted in proportion to the weight of the occupant of the seat to provide similar ride dynamics to any occupant of the seat.

40 Claims, 23 Drawing Sheets

U.S. PATENT DOCUMENTS

| | | | | |
|---|---|---|---|---|
| 4,448,386 A | * | 5/1984 | Moorhouse et al. | ........ 248/564 |
| 4,461,444 A | | 7/1984 | Grassl et al. | |
| 4,471,934 A | | 9/1984 | Meiller et al. | |
| 4,484,723 A | | 11/1984 | Meiller et al. | |
| 4,640,488 A | * | 2/1987 | Sakamoto | ................... 248/588 |
| 4,679,760 A | | 7/1987 | Dotzler et al. | |
| 4,684,100 A | | 8/1987 | Grassl | |
| 4,687,250 A | * | 8/1987 | Esche | ...................... 297/300.5 |
| 4,714,227 A | * | 12/1987 | Holm et al. | ........... 297/344.14 |
| 4,717,203 A | | 1/1988 | Meiller | |
| 4,733,847 A | | 3/1988 | Grassl | |
| 4,743,065 A | | 5/1988 | Meiller et al. | |
| 4,786,024 A | | 11/1988 | Goetz | |
| 5,058,852 A | | 10/1991 | Meier et al. | |
| 5,176,356 A | * | 1/1993 | Lorbiecki et al. | ...... 297/344.18 |
| 5,211,369 A | | 5/1993 | Hoerner | |
| 5,261,724 A | | 11/1993 | Meiller et al. | |
| 5,279,490 A | | 1/1994 | Meiller | |
| D362,126 S | | 9/1995 | Carter | |
| 5,487,589 A | | 1/1996 | Meiller et al. | |
| 5,490,657 A | | 2/1996 | Meiller et al. | |
| 5,502,284 A | | 3/1996 | Meiller et al. | |
| 5,505,521 A | | 4/1996 | Meiller et al. | |
| 5,533,703 A | | 7/1996 | Grassl et al. | |
| 5,560,263 A | | 10/1996 | Grassl et al. | |
| 5,613,662 A | | 3/1997 | Blackmore | |
| 5,979,990 A | | 11/1999 | Meiller et al. | |
| 6,186,467 B1 | | 2/2001 | Wahls | |

FOREIGN PATENT DOCUMENTS

| | | |
|---|---|---|
| EP | 1 180 449 A2 | 2/2002 |
| EP | 1 180 737 A2 | 2/2002 |
| FR | 1453618 | 8/1966 |
| FR | 1515555 | 1/1968 |
| GB | 2 243 998 A | 11/1991 |
| GB | 2 273 042 A | 6/1994 |
| WO | WO 84 02687 A | 7/1984 |
| WO | WO 90 11841 A | 10/1990 |

* cited by examiner

SEAT SUSPENSION

CROSS REFERENCE TO RELATED APPLICATIONS

This application claims priority from U.S. Provisional Patent Application Ser. No. 60/366,965, which was filed on Mar. 22, 2002.

FIELD OF THE INVENTION

The present invention is directed to a suspension for a seat and more particularly to a seat suspension that varies the preload, spring rate and damping rate of the suspension in proportion to the weight of the seat occupant.

BACKGROUND OF THE INVENTION

For an operator to efficiently control a piece of machinery, the seat which provides the operator an interface with the machine must be able to comfortably support the operator over an extended period of time. Over the years a number of different seat suspension designs have been developed to provide a comfortable support for an operator. In the majority of those designs, the seat suspensions are constructed to have the amount of resistance or support provided, and the vertical position of the seat adjusted to accommodate the weight of the operator through the use of various suspension mechanisms or systems positioned within the seat. These mechanisms typically use springs, dampers, linkages and other devices to adjust these characteristics of the seat to comfortably position the seat with respect to a particular operator.

However, most seats constructed today are not capable of adjusting the amount of support provided to a wide range of operators in a manner that does not sacrifice the comfort, more specifically the vibration attenuation of the seat to a particular population of operators. The spring rate generally must be low to accommodate the light operator mass and the damping rate must be high enough to limit end stop impacts of larger mass operators. Since these attributes are generally not adjustable in low cost seat suspensions, vibration isolation is compromised over the mass adjustment range. Seat vibration test standards such as ISO7096 can be difficult to pass with a nonadjustable spring rate and damping rate suspension. To accommodate a light mass operator the spring rate and damping are generally low. The low damping rate in turn results in suspension end stop impacts causing the designer to either increase the damping at the expense of the light operator's vibration isolation or increase the suspension stroke at the expense of SIP (seat index point) height.

As a result, it was advantageous to develop suspensions for a vehicle seat in which the operation of the suspension is adjustable in order to achieve desirable ride comfort for the seat for both a low weight occupant and a high weight occupant. To this end, a number of adjustable suspensions have been developed, with a pair of notable examples being disclosed in Meiller et al. U.S. Pat. Nos. 5,261,724 and 5,490,657, which are incorporated by reference herein in its entirety. In these patents and other similarly designed adjustable suspensions, the preload on a spring utilized in the suspension can be adjusted such that the spring, and thus the suspension, will provide more or less resistance to movement of the seat depending on the weight of the occupant. More specifically, these types of seat suspensions include a pivot plate that is connected to the spring and is fixed about a pivot point on the seat. The adjustment made to the spring preload in the suspension is made by changing in the distance over which the spring acts from the pivot. Thus, the adjustment involves moving the pivot plate to reposition the spring further from the pivot to increase the suspension preload, or closer to the pivot to decrease the preload.

Another patent of note is Wahls U.S. Pat. No. 6,186,467, which is also incorporated by reference in its entirety. In this patent the preload of a seat suspension is changed by adjusting the position of a slide to which one end of each of a pair of springs is connected. The movement of the slide increases or decreases the spring length such that the preload for the suspension can be adjusted as required for a particular occupant.

While these suspensions can adjust the support provided by a seat to an either high or low weight occupant, this structure of the suspension has a number of shortcomings. First of all, this suspension does not vary both the damping rate and the spring rate of the suspension in proportion to the suspended mass in order to provide an equally effective resistance from the suspension to any weight occupant sitting in the chair. As a result, these improved prior art suspensions have a high weight seat occupant transmissibility curve that is significantly different than the transmissibility curve for a lower weight seat occupant. This is an undesirable result because the difference between the transmissibility curves implies that more effort is required to adjust the suspension than necessary, since during weight adjustment the heavy operator is gaining an advantage in isolation over the light operator. Assuming it takes energy to improve the vibration response of the suspension, and since the suspension should be able to pass tests in all weight adjust settings, the additional effort is wasted and should be minimized.

In order to have transmissibility and ride dynamics for a seat suspension that are equivalent regardless of the mass of the occupant, the damping rate, the spring rate, and the spring preload of the seat suspension would all need to be adjustable in relation to one another. Thus, it is desirable to develop a seat suspension that can provide the same effective ride to support to any occupant of the seat which can be accomplished by varying the damping rate, spring rate and suspension preload proportionally with regard to the suspended or apparent weight of the occupant. This is because by changing the spring rate and damping rate together in proportion to the apparent operator weight change, the transmissibility curves for the suspension for each apparent operator weight are kept coincident. The coordination of the spring and damping rates should also allow the work required to change the weight setting for the suspension to be minimized.

Another shortcoming of a number of these prior art adjustable seat suspensions is that, in seat configurations where the suspension is disposed beneath the seat, the overall seat height and seat index point (SIP), is too high for many applications. The SIP is measured using a standard measurement device well known in the art that essentially represents the location of the hip pivot of the seated occupant. This is a point in space that serves as a reference point for the positions of other structures in the vehicle, such as the pedals, the steering control, etc., that can be used in order to apply ergonomic principles to design the interior of a vehicle. If the SIP location positions an operator too close to the controls of a vehicle, an occupant will not be able to get into the seat without striking the controls, possibly damaging the controls, injuring the occupant and/or causing the vehicle to inadvertently move in an uncontrolled manner.

Also, the prior art suspensions used a spring with a low spring rate which requires significant deflection of the spring to adjust the preload of the suspension an adequate amount for a wide range of occupant weights. This long deflection of the spring requires significant space under the seat, consequently increasing the size of the suspension and of the seat incorporating the suspension.

An additional shortcoming of many seat suspensions that adjust the suspension preload to accommodate operator mass by directly increasing the spring preload is the effort required to make said adjustment. The adjustment often requires multiple turns of a hand-controlled knob which requires increased torque to be applied as the spring preload increases. Therefore, it is desirable to develop an operator mass adjustment mechanism that requires the operator to impart a sufficient low and constant force through the adjustment range.

Further, in those seat configurations where the suspension system is positioned within the backrest of the seat, such as in the seats disclosed in the Meiller et al. patents, the problems with an SIP that is too high are obviously not present. However, these configurations have other drawbacks in that the backrest is severely limited in its ability to be reclined or folded forwardly over the seat which is useful for vehicles in which a fuel storage tank is disposed behind the seat, such as a lift truck. In addition, the depth of the backrest can limit the available fore/aft adjustment range of the seat suspension assembly.

Therefore, it is also desirable to develop a seat suspension that can be disposed either under a seat or in a backrest as required to provide the desired type and range of motion for the seat on the particular vehicle. Also, the suspension should require a sufficiently low deflection length for the springs in the suspension to significantly decrease the packaging envelope of the suspension and reduce the effort required to adjust the suspension preload. This reduction will allow for under-seat placement of the suspension such that the seat is positioned at a sufficiently low SIP while also allowing the backrest to recline fully, move forwardly, and rearwardly, and have the feature of folding over the seat.

SUMMARY OF THE INVENTION

A suspension for the seat of a vehicle that minimizes the effort to adjust and proportionally adjusts the suspension preload, and the damping rate and the spring rate of the suspension together based on the suspended mass to provide the same effective isolation from machine vibration for a particular occupant regardless of weight. The seat suspension of this invention is particularly well suited for use in a fork truck or lift truck, a skid steer, an agricultural tractor, a backhoe, other construction equipment, as well as other vehicles that are typically designed for off-road use. This suspension is particularly ideal for vehicle applications that require a relatively short suspension stroke in order to maintain a low SIP for the seat. Further, the suspension can be positioned either under the seat or within the backrest to provide the desired range and type of movement for the seat.

By enabling an occupant to vary the suspension preload, the damping rate and spring rate, the suspension of the present invention is able to meet the standardized testing criteria for these types of seats without compromising ride dynamics while lessening the adjustment effort. More specifically, as a result of the construction of this seat suspension, the ride dynamics of the seat for both a higher weight seat occupant and a lower weight seat occupant are relatively consistent, in that one is not compromised for the benefit of the other. This is achieved by varying the suspension preload, the damping rate and the spring rate for the suspension in proportion with the apparent or suspended mass acting on the suspension which includes the occupant and the weight of the seat and any attachments to the seat, among other things. More specifically, the suspension damping rate and spring rate for a 60 kilogram mass will both drop by half from the damping rate and the spring rate of the suspension for a 120 kilogram mass. Stated in another way, the spring rate of the suspension for the 120-kilogram mass will be twice as great as the spring rate of the suspension when a 60-kilogram mass is supported by the suspension. This will also be true for the damping rate, i.e., it will be twice as great for the 120-kilogram mass as it will be for a 60-kilogram mass. Also, the suspension preload is adjusted in conformance with the suspended mass.

According to a primary aspect of the invention, the key to achieving the proportional adjustments in the spring preload, spring rate and damping rate is the arrangement in the suspension of the springs, a transfer link, and the attachment of a damper between the transfer link and a ground. In the suspension system of the present invention, the ground constitutes a fixed part of the suspension or seat, such as a fixed or nonmovable part of the seat, i.e., the seat frame or the back frame, or the suspension base. A first spring is connected between the ground and an actuating mechanism, such as a bellcrank, and supplies a preload to the movement of the actuating mechanism. The actuating mechanism is engaged by a seat frame and cushion on which an occupant will sit. The seat frame is supported above and operably connected to the suspension by a suitable linkage structure, such as a pair of scissors arms. The actuating mechanism is also connected to the pivotal transfer link that operates to supply a variable amount of additional resistance to movement of the actuating mechanism from a second spring connected to the transfer link.

In the suspension, the transfer link has a movable pivot point or main transfer link pivot, that is positionable by a prospective seat occupant selecting a weight adjust position using an associated weight adjustment mechanism. Because the transfer link pivot point can be moved, thereby changing the mechanical advantage of the second spring, the suspension preload imparted to the actuating mechanism can be increased or decreased.

Also, the suspension spring rate is adjusted due to the connection of the second spring opposite the connection of the actuating mechanism. The movement of the pivot point on the transfer link causes the moment arm existing between the second spring and the pivot point to be lengthened or shortened, thereby altering the amount of resistance to the movement of the actuating mechanism and transfer link provided by the second spring. Therefore, the movement of the pivot point for the transfer link effectively enables an occupant to position the pivot point at a location where the spring rate for the suspension as provided by the both springs is changed proportionately to the apparent weight of the occupant.

Furthermore, the movable transfer link pivot point enables the effective system damping rate to be varied proportionally to the occupant weight without using an adjustable damper. This is due to the fact that the mechanical advantage provided by the damper is adjusted as a consequence of moving the location of the pivot point of the transfer link that also moves the damper to a position where the damper can extend a greater or lesser distance when the suspension is in operation. Therefore, the velocity of the damper rod will be greater in the high weight adjustment position, increasing the effective damping coefficient, than in the low weight position, where the damper rod velocity and effective damping coefficient are reduced. As a result, the suspension has a proportionally adjusted damping rate achieved by using a simpler, cheaper, and more reliable fixed-rate damper.

To move the pivot point of the transfer link and adjust the spring preload, spring rate and damping rate for the suspension, the suspension includes a weight adjust arm that forms part of the weight adjustment mechanism. The weight adjust arm is moveable with regard to the transfer link and carries the pivot point about which transfer link pivots. More specifically, a movable pivot pin is attached to the weight adjust arm and moves in concert with the weight adjust arm and bears against the transfer link. The point where the pivot pin bears against the transfer link is the location of the pivot point about which the transfer link moves during operation of the suspension system. To move the pivot pin with respect to the transfer link, the weight adjust arm, in turn, pivots about a stationary pivot that is fixed to the suspension base or ground and spaced from the movable transfer link pivot pin. As the weight adjust arm is moved about the fixed pivot pin, the movable pivot pin is moved along the transfer link.

The movable pivot pin, or main transfer link pivot, is fixed to the weight adjust arm and carries a bearing that rides against an edge of the transfer link as the pivot pin is moved with respect to the transfer link and during adjustment of the suspension system. The bearing minimizes wear of the movable pivot pin and the surface of the transfer link that comes into contact with the movable link pivot pin while also allowing the pivot pin to move smoothly along the transfer link. Further, the surface of the transfer link that is engaged by the movable pivot pin is curved such that the shape of the surface is complementary with an arcuate path of travel for the pivot pin. Therefore, when the movable pivot pin is moved using the adjustment mechanism, the rotary movement of the weight adjust arm moves the pivot pin along the surface of the transfer link such that there is very little resistance to the movement of the weight adjustment mechanism in the upper third of the overall range of motion of the suspension.

The transfer link is urged into contact with or pulled against the movable pivot pin by the up-stop restricting motion of the actuating mechanism and by the second spring that has one end attached to the transfer link and its other end attached to ground, such as a post that extends outwardly from the suspension base. As a result, when the actuating mechanism is engaged by an occupant sitting on the seat frame, the transfer link moves much like a lever arm during operation of the suspension as it pivots about the movable pivot pin.

As a consequence of the configuration of the suspension, the transfer link has one additional degree of freedom of movement, namely, in a generally lateral direction along the transfer link surface engaged by the movable pivot pin. To prevent or constrain the motion of the transfer link in this direction, the transfer link includes a slide pin that extends outwardly from the transfer link and that is received within a curved slot formed in the suspension base or ground which guides the slide pin and consequently the transfer link as they rotate around the movable pivot pin. More particularly, the curved slot in the suspension base that is formed to conform to the rotary path of that transfer link will take about any location of the movable pivot pin with respect to the transfer link to provide pure arcuate movement to the transfer link as the suspension operates. Further, to provide smooth arcuate movement of the slide pin, the slide pin carries a bearing that is received in the slot and that provides an amount of lubricity and wear resistance to the slide pin and the slot.

According to another aspect of the present invention, the weight adjustment mechanism is configured to enable an occupant to set the suspension at a number of separate positions corresponding generally to occupants of different, specified weights. In order to illustrate the weight at which the adjustment mechanism is set, the suspension can also include an optional indicator to identify the approximate weight of an occupant for which the suspension is currently configured so that an occupant can easily adjust the mechanism to the proper suspension setting. Further, the design of the adjustment mechanism has the desirable result that the mechanism is easy to operate, even for a seated occupant, and that the force required to move the weight adjustment mechanism between the separate positions is relatively minor. This low energy weight adjustment mechanism is achieved by changing the mechanical advantage of the second spring while not significantly displacing or elongating the spring.

According to still another aspect of the present invention, the seat frame is formed to include a pair of opposed pivot shafts that receive and engage opposite ends of a cross beam that extends across the seat frame. The cross beam has a cross-section that is arcuate in shape and includes a generally straight lip extending outwardly along one edge. The straight lip forms a land against which the actuating mechanism bears in order to effectively operate the suspension. The pivot shafts are held against the cross beam without the use of any fasteners or other connection between the pivot pin and the cross beam. Specifically, the shafts are held on the cross beam by retainers disposed on opposite sides of the suspension system that are engageable with the seat frame. By holding the frame and shafts in engagement with the cross beam without fasteners, the time required to assemble the suspension is greatly reduced.

Objects, features and advantages of this invention are to provide a suspension: that varies the preload, spring rate and damping rate proportionally based upon the apparent weight of the occupant of the seat; that includes an easy to operate weight adjustment mechanism used to control the operation of the suspension based on the weight of the occupant; that includes a smoothly operable transfer link for the suspension that has a moveable pivot point; that forms a connection between the suspension and the seat frame that eliminates the need for fasteners or other connections between the seat frame and the suspension; that has a compact construction to reduce the overall height of the seat; and that is strong, rugged, easy to assemble, durable, of simple design, compact and economical construction and which is easy to use and operate.

BRIEF DESCRIPTION OF THE DRAWINGS

Preferred exemplary embodiments of the invention are illustrated in the accompanying drawings in which like reference numerals represent like parts throughout and in which.

Figure 1:
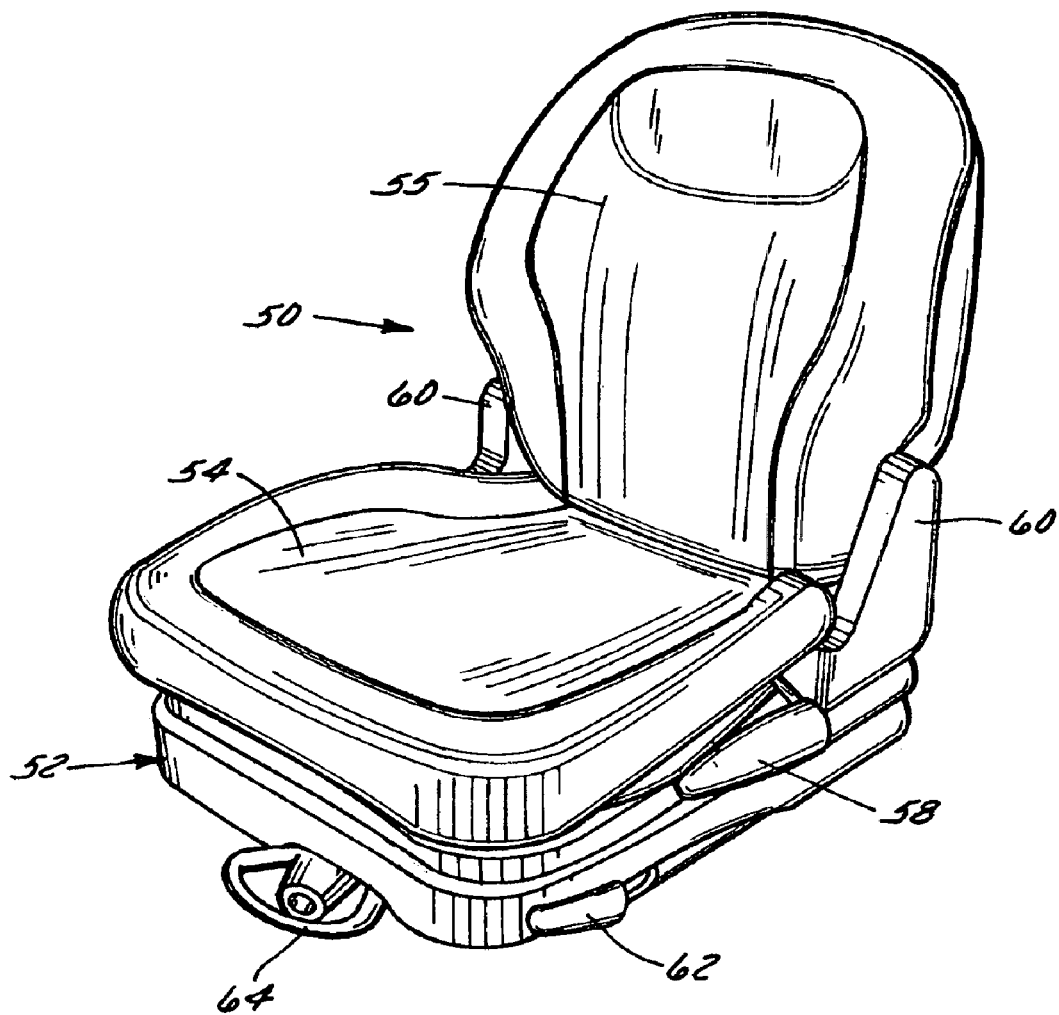
FIG. 1 is an isometric view of a vehicle seat equipped with a seat suspension constructed according to the present invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 14:
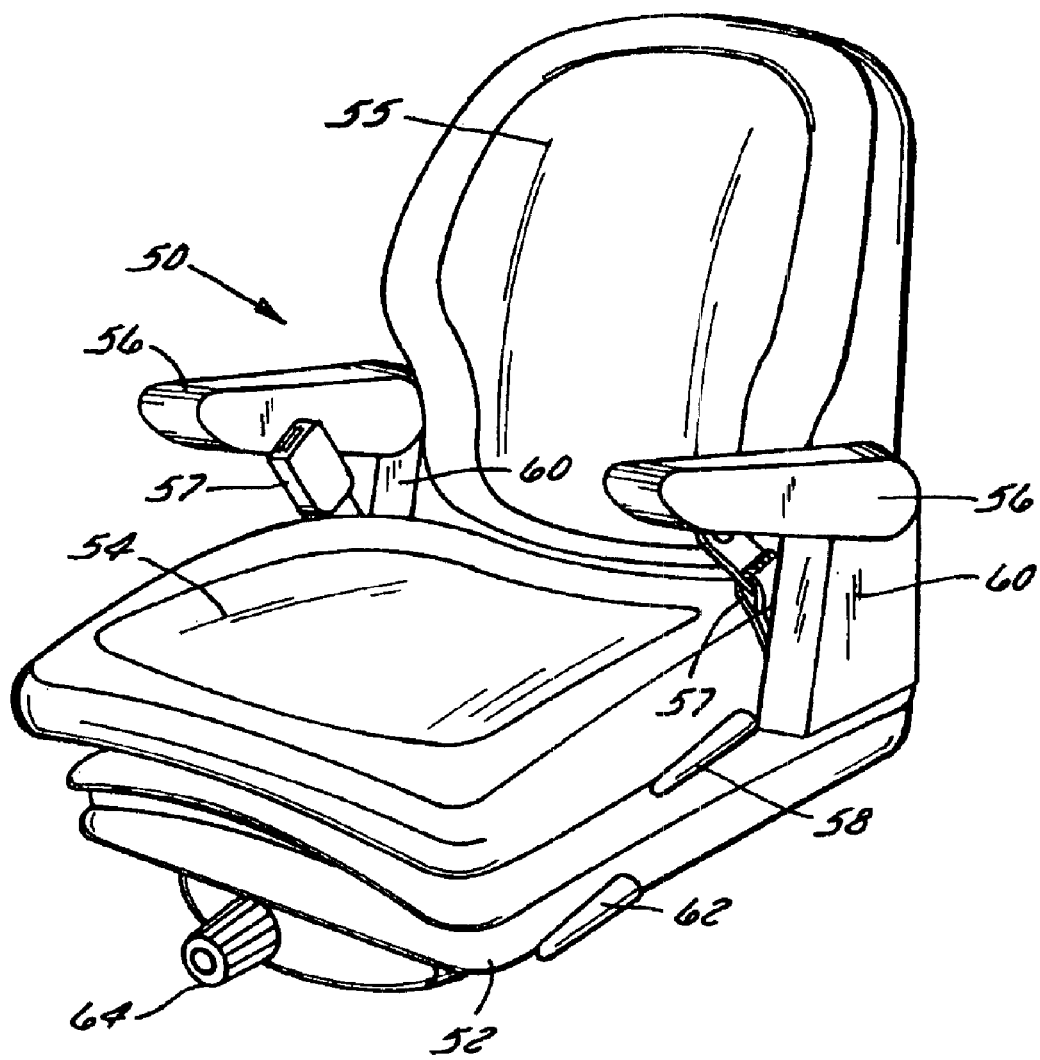
FIG. 14 is an isometric view of a seat including a second embodiment of the seat suspension of the present invention.
Figure 15:
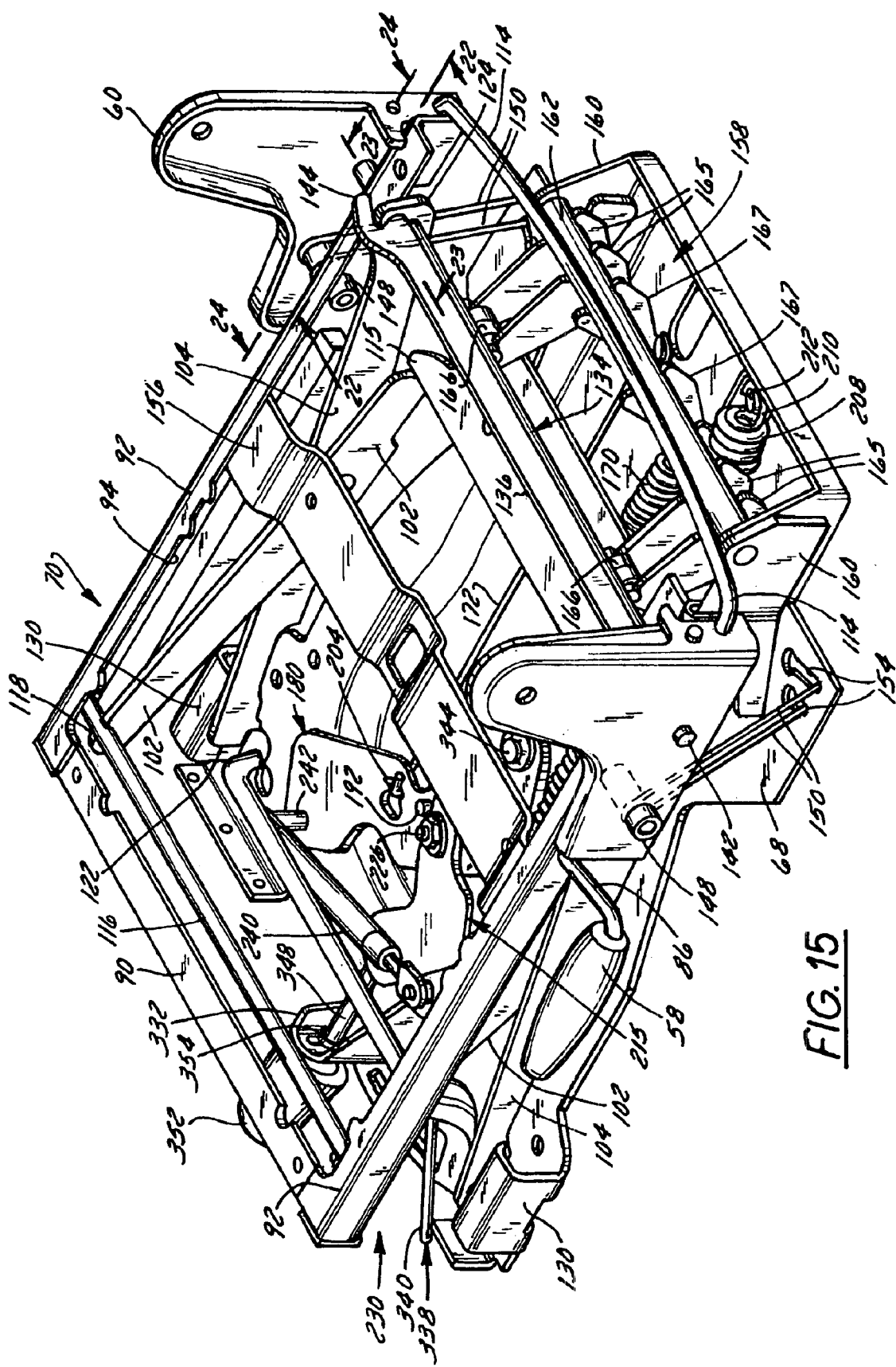
FIG. 15 is an isometric view of a second embodiment of the seat suspension of the present invention.

FIGS. 1 and 14 illustrate a seat 50 including a frame 52 that supports a seat cushion 54 and a backrest 55 and a suspension base 68. While the seat 50 is illustrated as being a bucket-type seat, including a pair of armrests 56 and a seat belt mechanism 57 (as shown in FIG. 14), the seat 50 can take any form for a seat used on a machine or vehicle. The frame 52 includes a first handle 58 used to control a pivoting mechanism 59, best shown in FIG. 2, extending between and connected to the seat frame 70 and backrest frame 72 and covered by a pair of cover plates 60. The suspension base 68 includes a second handle 62 that is used to operate a positioning mechanism (not shown) as is known in the art which enables the seat 50 to be moved forwardly or rearwardly with respect to the vehicle in which the seat 50 is located. Also, the suspension base 68 includes a third handle 64 that operates to adjust a weight adjustment mechanism 214 disposed within the suspension base 68 that will be described in more detail herein.

Figure 2:
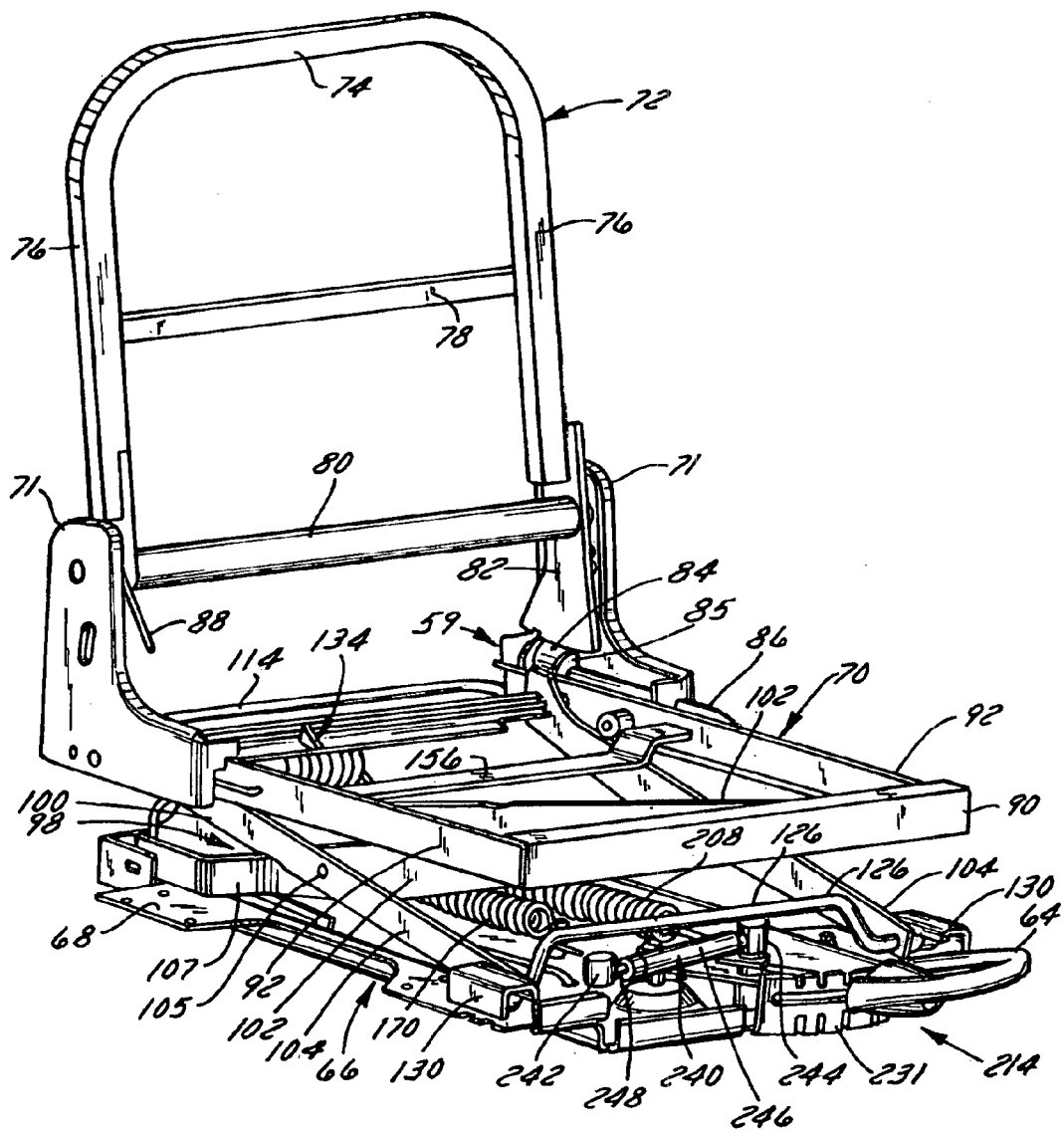
FIG. 2 is an isometric view of a first embodiment of the suspension.

Referring now to FIG. 2, the interior of the seat 50 is illustrated in more detail. The seat 50 includes a seat suspension 66 secured to a suspension base 68 which forms a bottom for the frame 52 of the seat 50 and is preferably formed of a metal, such as a low carbon steel, having a thickness of between 1 mm and 5 mm, and preferably about 3 mm. The suspension 66 is connected to a seat frame 70 opposite the suspension base 68 that provides a rigid structure on which the seat cushion 54 is attached. A pair of brackets 71 are fixed to opposite sides of one end of the seat frame 70 and are located on opposite sides of a backrest frame 72 that is pivotally secured to each bracket 71. The backrest frame 72 is generally U-shaped including an upper end 74 and pair of downwardly extending arms 76 on each side of the upper end 74. The arms 76 are preferably interconnected by a brace 78, and each arm 76 is further connected to a bar 80 opposite the upper end 74. The bar 80 is rotatably connected between the brackets 71 in order to pivot between an upright position, shown in FIG. 2, to a folded position (not shown). The bar 80 is further connected to the pivoting mechanism 59 that, in a particularly preferred embodiment, includes a locking plate 82 which extends downwardly from one end of the bar 80 into engagement with a locking member 84 rotatably positioned between a pair of stays 85 disposed on the adjacent bracket 71. The locking member 84 is connected to a rod 86 extending between the stays 85 and through the locking member 84 at one end, and connected to the first handle 58 at the opposite end. Thus, by rotating the first handle 58 with regard to the bracket 71 and the stays 85, the locking member 84 can be rotated away from and out of engagement with the locking plate 82, allowing the bar 80 and backrest frame 72 to rotate with respect to the brackets 71 and the seat frame 70. Further, opposite the locking plate 82, the bar 80 also supports a torsion spring 88 disposed around the bar 80 and engaged with the bar 80 and the adjacent bracket 71. When the locking member 84 is disengaged from the locking plate 82 using the first handle 58, the torsion spring 88 operates to bias the backrest frame 72 downwardly towards the seat frame 70 and into the collapsed position.

Figure 3:
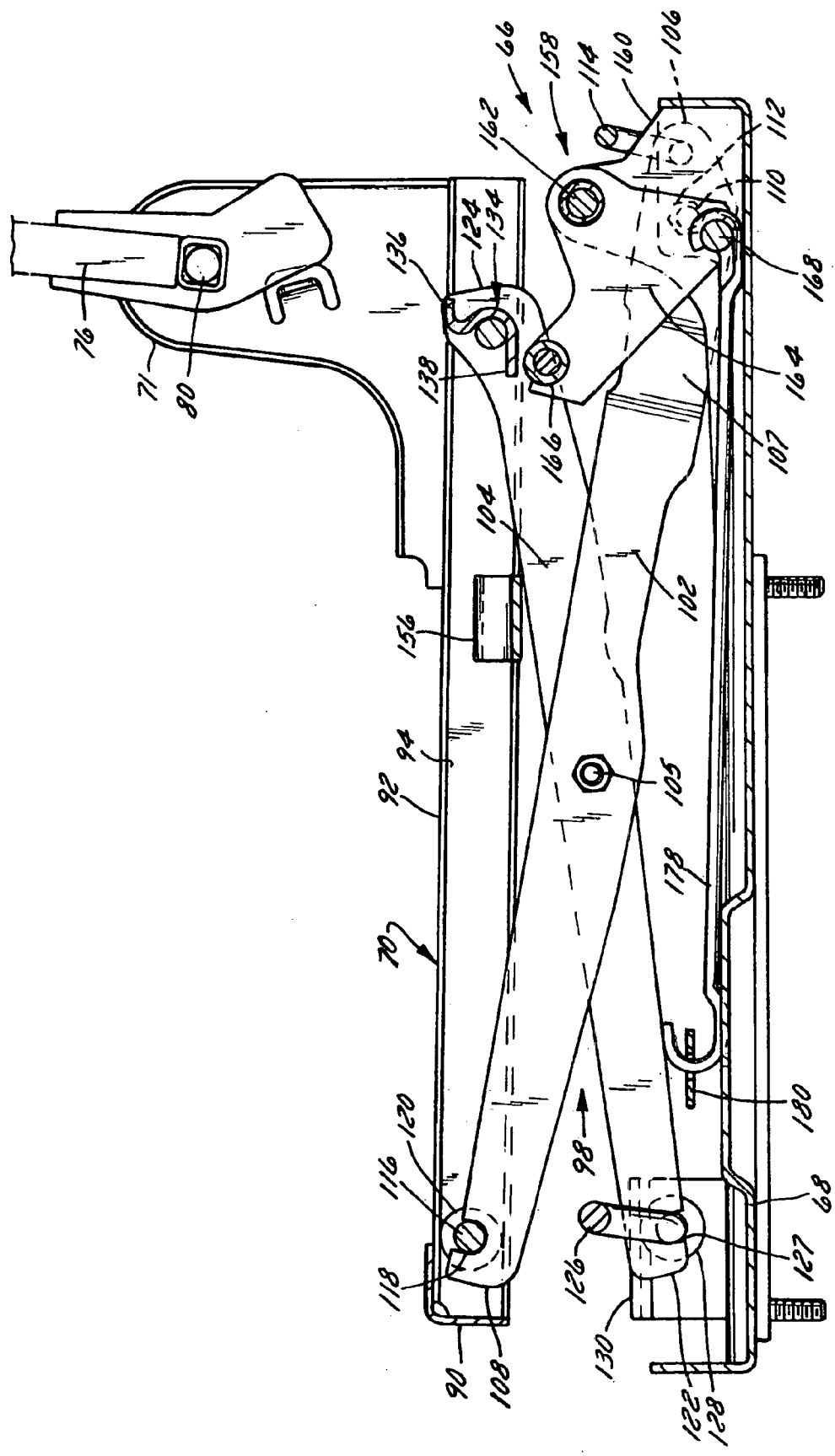
FIG. 3 is a side plan view of a seat frame and suspension base connected to the suspension of FIG. 1 in an extended position.
Figure 4:
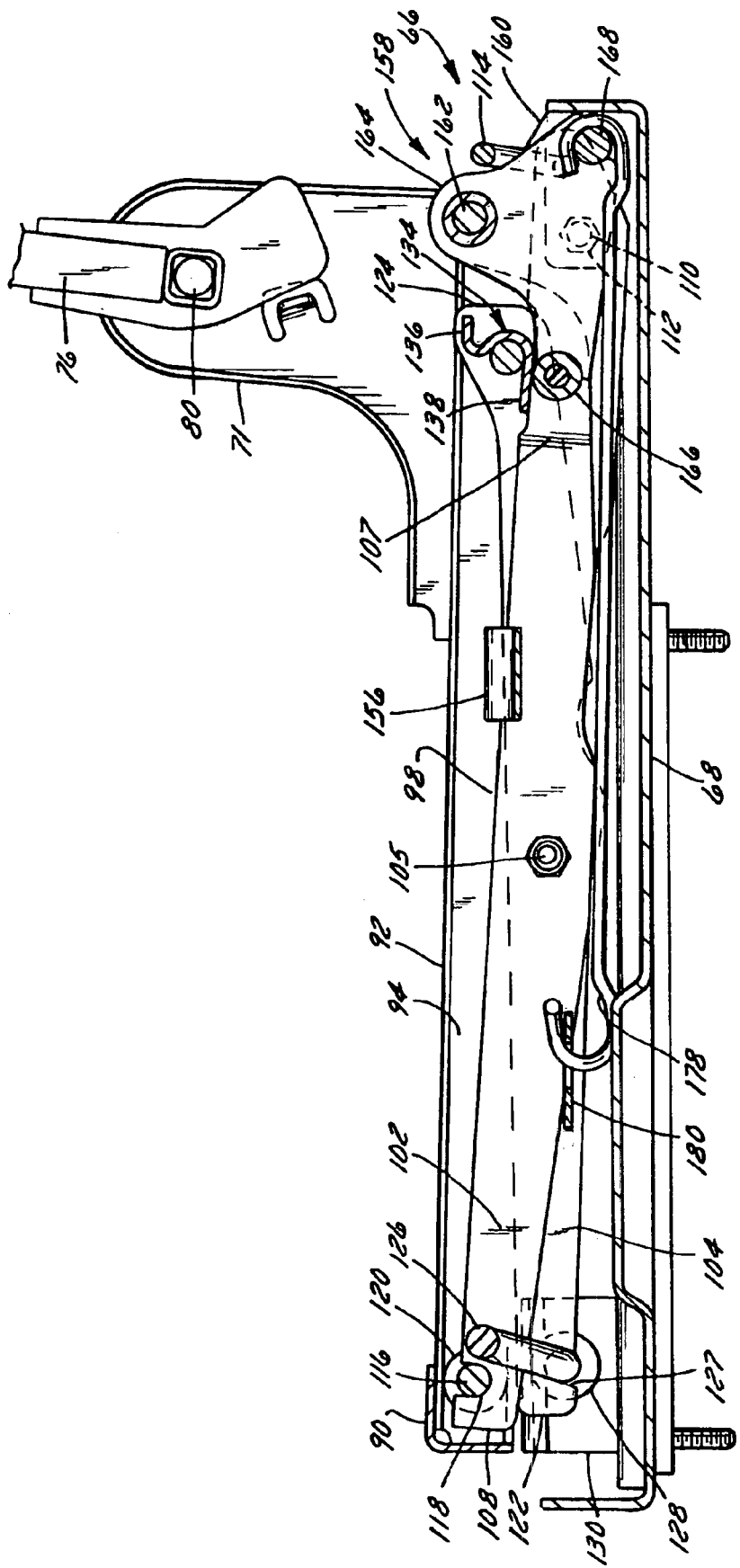
FIG. 4 is a side plan view of the seat frame, suspension base, and suspension of FIG. 1 in a collapsed position.
Figure 5:
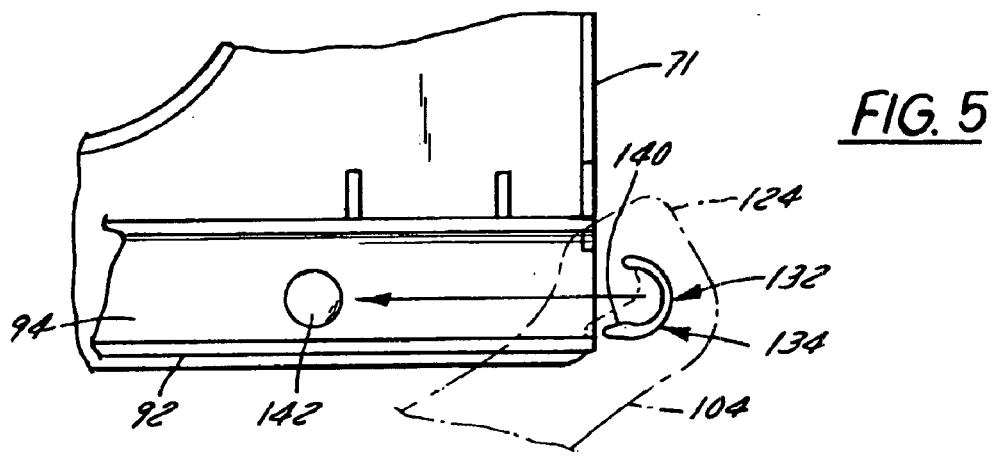
FIG. 5 is a partially broken away side plan view of the seat frame disengaged from the suspension of FIG. 1.
Figure 6:
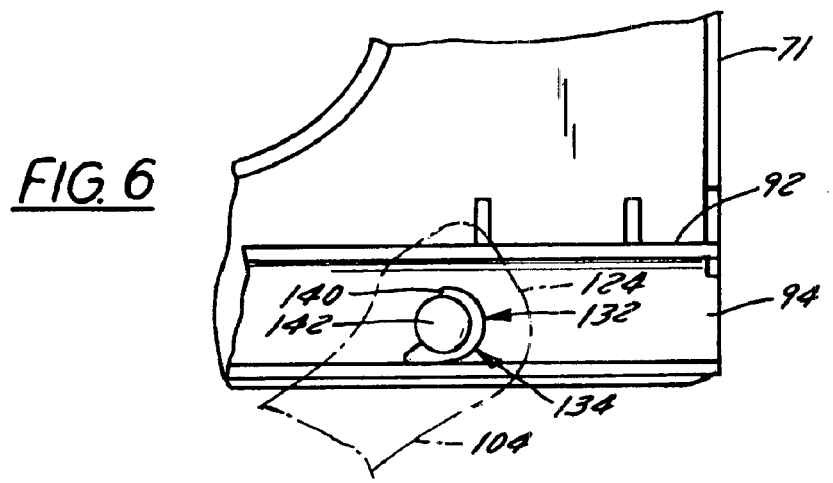
FIG. 6 is a partially broken away side plan view of the seat frame partially engaged with the suspension of FIG. 1.
Figure 7:
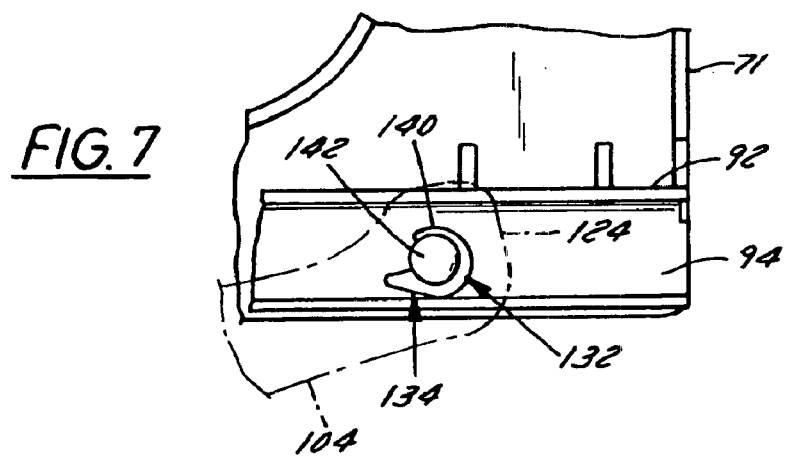
FIG. 7 is a partially broken away side plan view of the seat frame engaged with the suspension of FIG. 1.
Figure 8:
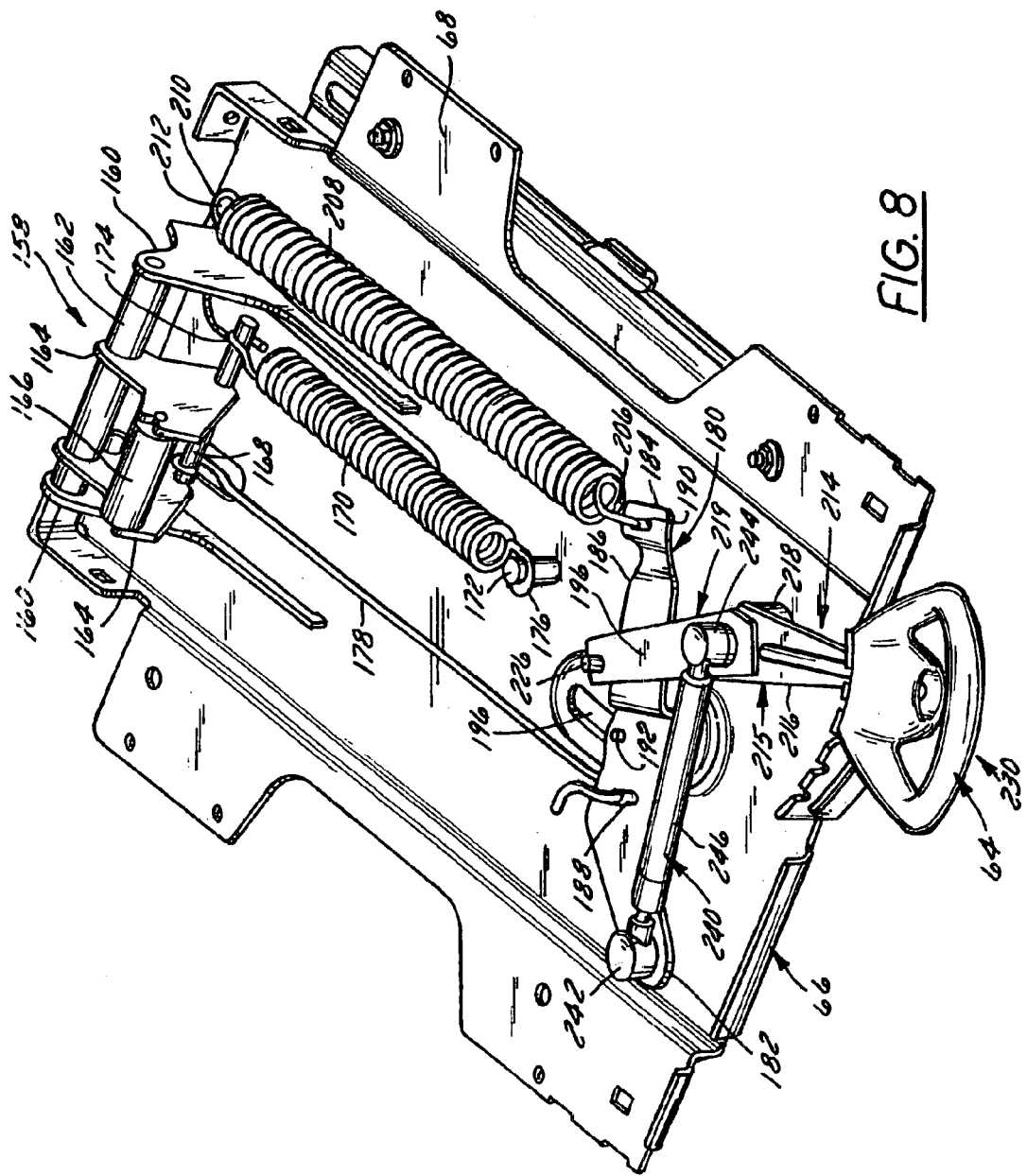
FIG. 8 is an isometric view of the suspension base and suspension of FIG. 1.
Figure 9:
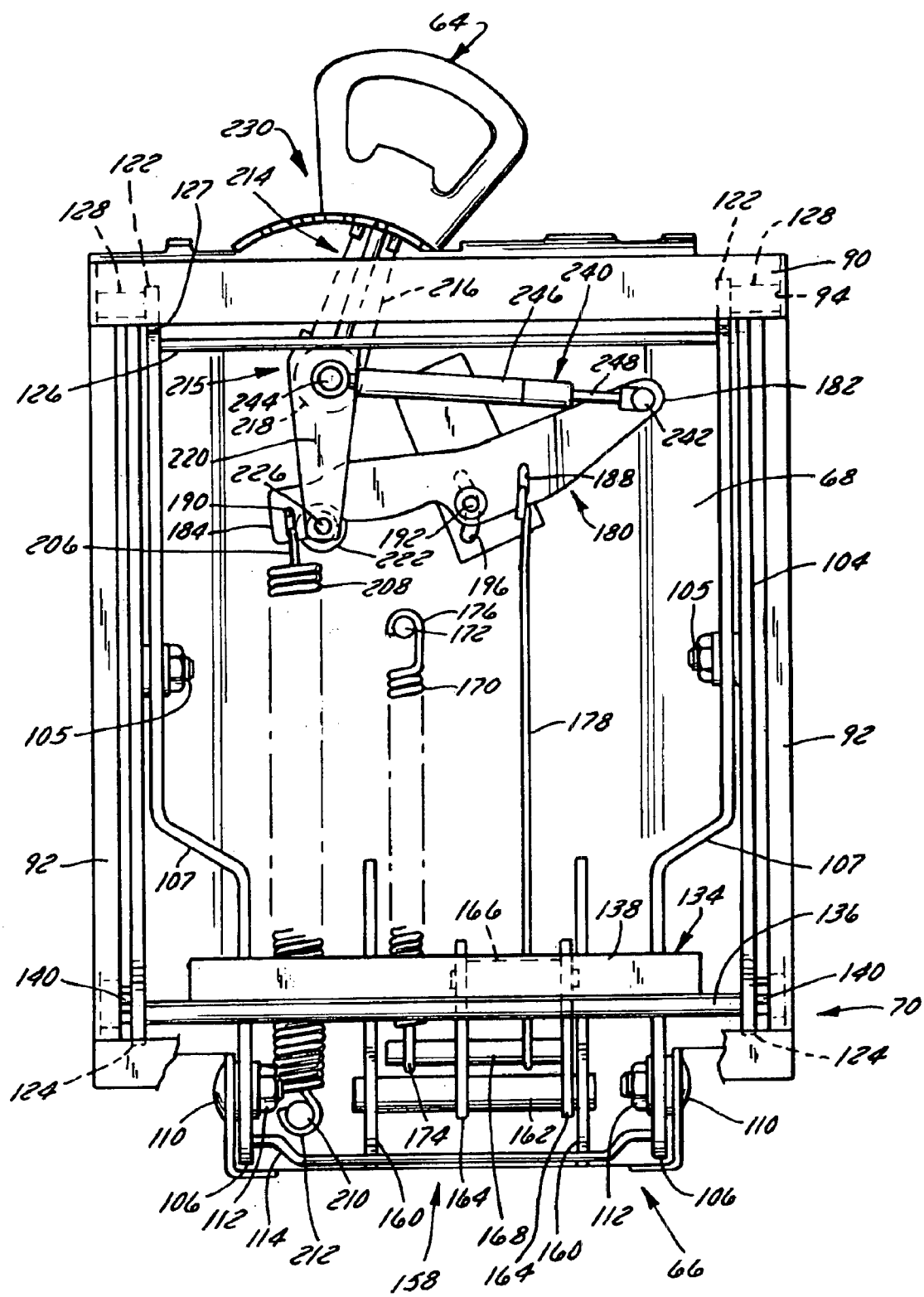
FIG. 9 is a top plan view of the suspension base and suspension of FIG. 1.
Figure 10:
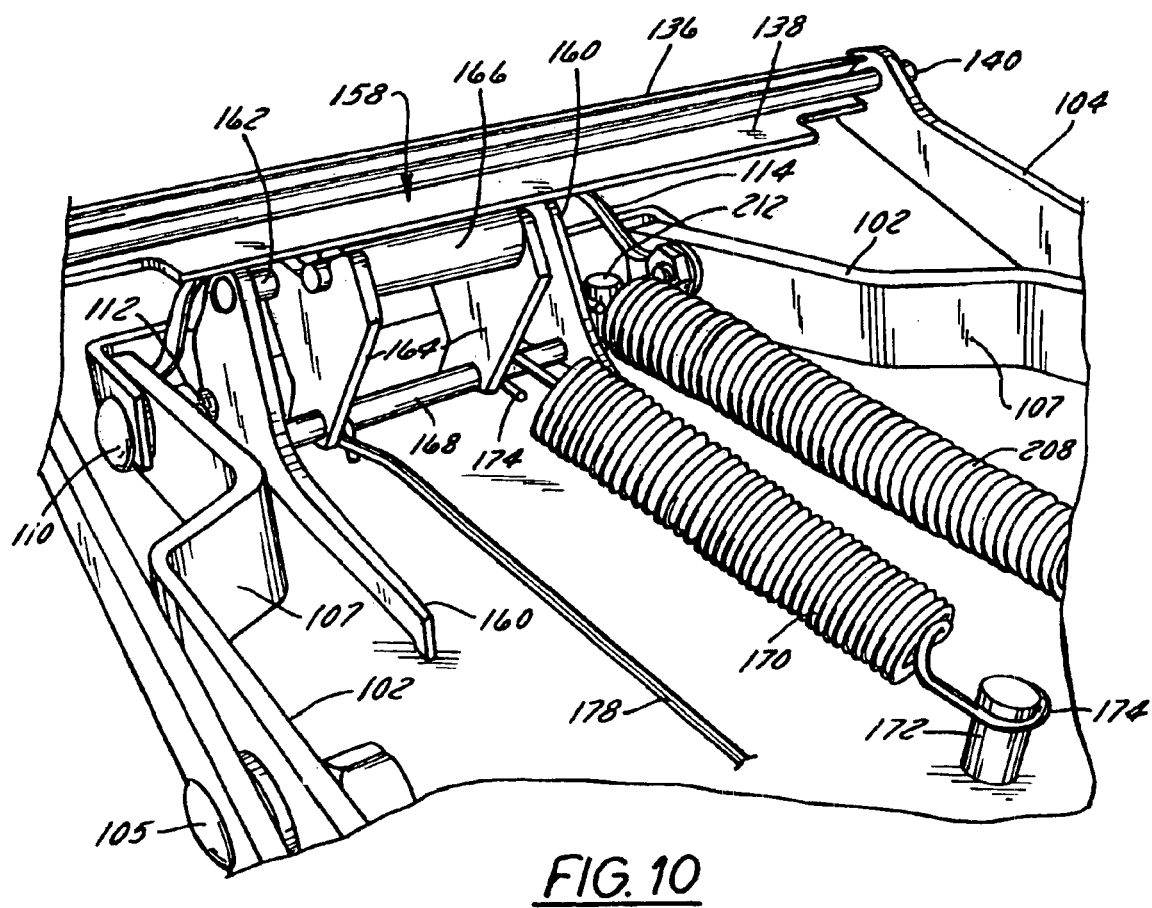
FIG. 10 is a partially broken away isometric view of the suspension of FIG. 9.

Referring now to FIGS. 2–4, the seat frame 70 is generally rectangular in shape and includes a front member 90 and a pair of side members 92 connected to opposite ends of the front member 90. Each of the side members 92 are formed as generally U-shaped channels, with the open ends 94 of each side member 92 facing one another across the seat frame 70. In order to maintain the side members 92 spaced a specific distance from one another, opposite the front member 90, the side members 92, to which each of the brackets 71 are connected, are interconnected by the bar 80 and backrest frame 72, and by a positioning rod 96 extending between each of the brackets 71.

The seat frame 70 is connected to the suspension base 68 by the suspension 66 shown in an extended position in FIG. 3, and a fully collapsed position in FIG. 4. The suspension 66 can connect the suspension base 68 to the seat frame 70 using any conventional linkage assembly utilized in the construction of seats, but preferably utilizes a scissors linkage assembly 98 including opposed pairs of scissors linkages 100 disposed on opposite sides of the suspension base 68. Each scissors linkage 100 includes a rigid inner arm 102 and a rigid outer arm 104 pivotally connected to one another by fasteners 105 disposed at the midpoint of each inner arm 102 and outer arm 104.

Each of the inner arms 102 includes a first end 106 pivotally connected to the suspension base 68, a bend 107 disposed inwardly from and extending outwardly from the plane of the first end 106, and a second end 108 engageable within the open end 94 of each of the side members 92 adjacent the front member 90. Each first end 106 is pivotally connected to the suspension base 68 by a pair of bolts 110 that extend through aligned openings in the first end 106 and the suspension base 68, respectively. The bolts 110 are secured therein by nuts 112 engaged with the bolts 110, and the first ends 106 are maintained in alignment with one another by a plate 115 secured between the bends 107 of each inner arm 102.

Each second end 108 of the inner arms 102 is engaged with a shaft 116 having its opposite ends each disposed within a U-shaped recess 118 in each of the inner arms 102 adjacent each second end 108. Each end of the shaft 116 rotatably supports one of a pair of rollers 120 that are each formed of a low-friction material and have a diameter slightly less than that of the open end 94 of each side member 92. The rollers 120 are positioned within the open end 94 of the side members 92 such that the rollers 120 can move fore and aft along the interior of the side members 92 to allow rotation of the inner arm 102 with respect to the suspension base 68 when the seat frame 70 is moved both towards and away from the suspension base 68 using the suspension 66.

Each outer arm 104 also includes a first end 122 and second end 124. Each first end 122 includes a positioning rod 126 extending through and fixed within an opening 127 disposed in each first end 122. A portion of the rod 126 extending through each first end 122 rotatably supports one of a pair of rollers 128 that are each formed similarly to rollers 120 and disposed within a channel 130 located on the suspension base 68 which rotatably retains the roller 128 therein. The rod 126 extends between the first ends 122 to support each roller 128 and also to ensure the alignment of the respective first ends 122.

The second ends 124 each include an arcuate slot 132 extending therethrough that is adapted to receive and engage one end of a crossbeam 134. The crossbeam 134 is generally arcuate in cross-section and includes an upper lip 136 that is fixedly connected to each of the second ends 124 of the outer arms 104 in any conventional manner, such as by welding, and a lower lip 138 that extends between the outer arms 104. In a first embodiment, each end of the crossbeam 134 that extends through the arcuate slots 132 forms a receiver cup 140 which rotatably supports a shaft 142, as best shown in FIGS. 3–7. Opposite the cup 140, each shaft 142 is fixedly connected to the bracket 71 and side member 92 such that each shaft 142 forms a part of the seat frame 70. The engagement of the shaft 142 within the receiver cup 140 enables the cup 140 and the second end 124 of each outer arm 104 to move or pivot with respect to the shaft 142 and frame rail 70 when the frame rail 70 is depressed, consequently compressing each of the scissors linkages 100. In this embodiment, the receiver cup 140 can only be assembled to engage the shaft 142 when the outer arms 104 are angularly displaced in a first position with respect to the seat frame 90, shown in FIG. 5. Clockwise rotation of the outer arm 104 about shaft 142 in the direction shown in FIG. 6 engages and retains cup 140 between shaft 142 and U-shaped side member 94 in fore, aft and vertical directions.

Figure 22:
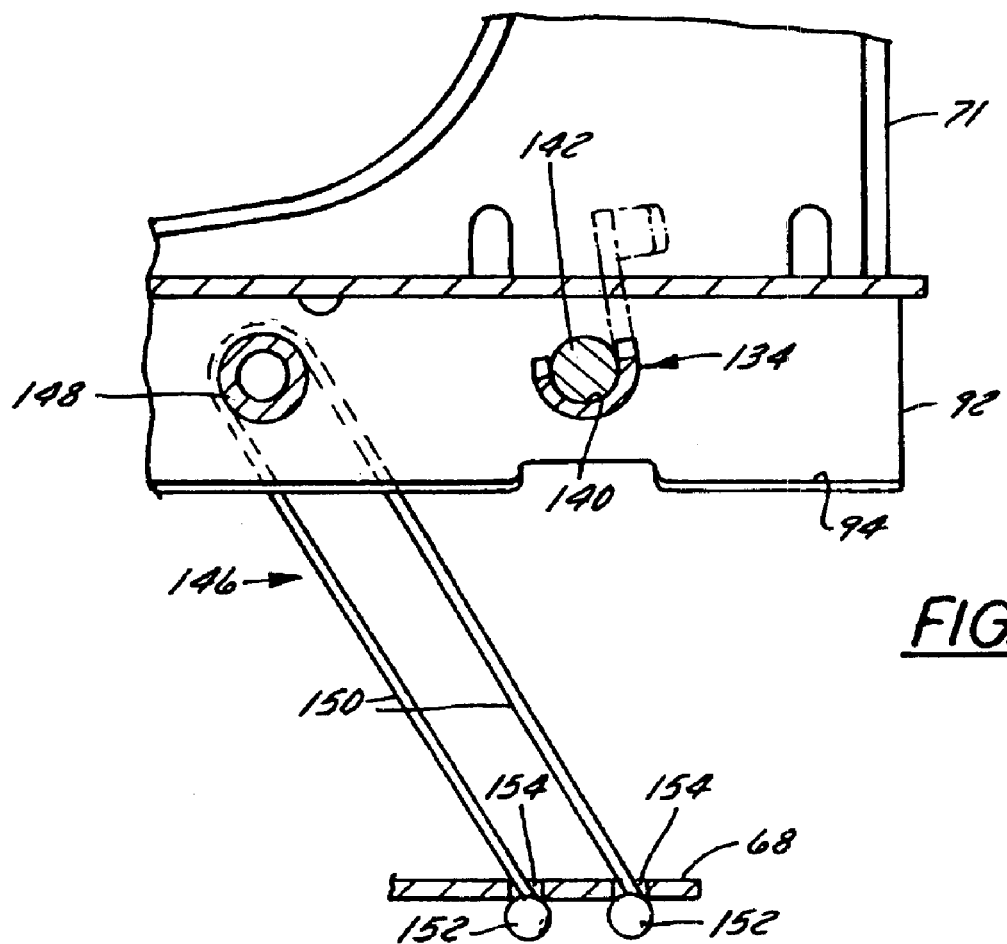
FIG. 22 is a partially broken away cross-sectional view along line 22—22 of FIG. 15.
Figure 23:
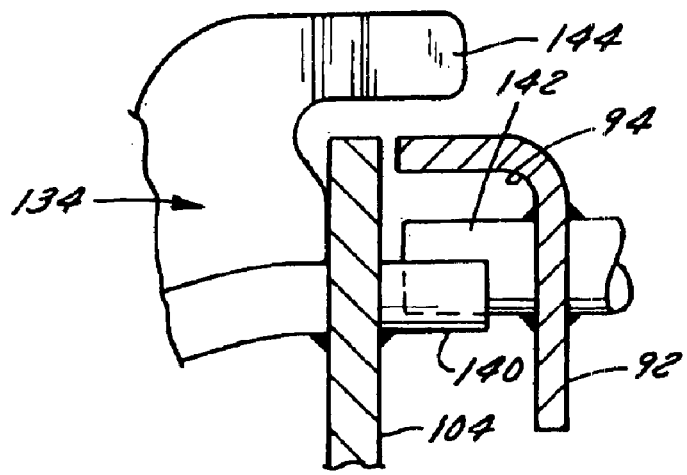
FIG. 23 is a partially broken away cross-sectional view alone line 23—23 of FIG. 15.
Figure 24:
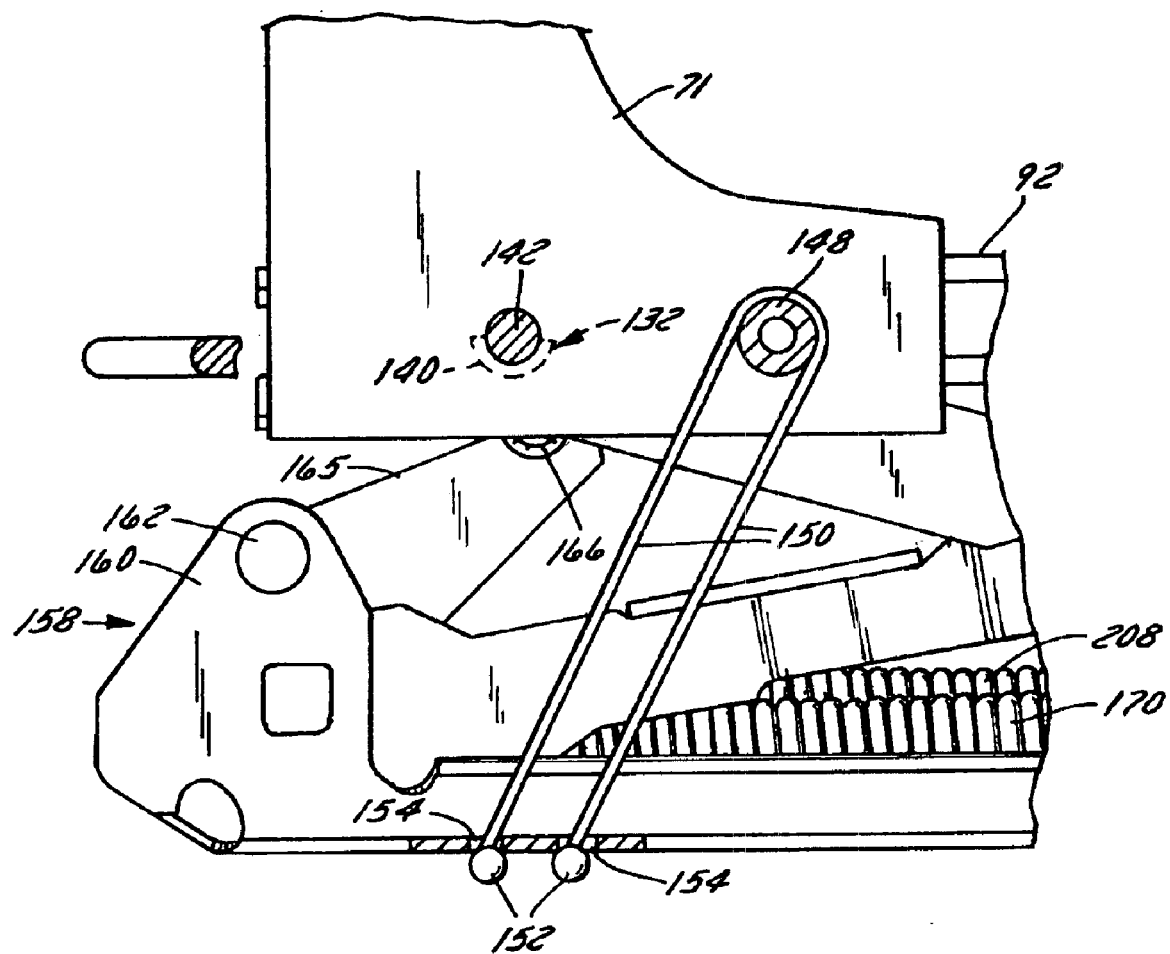
FIG. 24 is a partially broken away cross-sectional view along line 24—24 of FIG. 15 secured to the seat frame.

FIGS. 22 and 23 show an alternative embodiment for the receiver cup 140 that is oriented to allow assembly to the shaft 142 in a vertical direction. In this alternative embodiment, to prevent the disengagement of the shaft 142 from within each receiver cup 140 to hold the seat frame 70 on the suspension 66, the upper lip 136 of the crossbeam 134 preferably includes a pair of tabs 144 at either end which are fixed to the upper lip 136 and project outwardly from the crossbeam 134 over each side member 92. Alternatively, or in addition to the tabs 144, the shafts 142 can be maintained within the receiver cups 140 during movement of the frame rail 70 by a pair of retainer assemblies 146 disposed on opposite sides of the suspension base 68 below the brackets 71. Each retainer assembly 146 includes a cylindrical stop 148, that also serves as the attachment location for the seat belt mechanism 57, fixed to and extending inwardly from each bracket 71 towards and through the adjacent side member 92. A cable 150 is looped around the stop 148 and includes a pair of opposed, enlarged locking ends 152. The locking ends 152 are insertable into a pair of aligned keyhole slots 154 located in the suspension base 68 below the brackets 71 to hold the cable 150 around the stop 148. Thus, when the seat suspension 66 is in the fully extended position, the enlarged ends 152 of the cable 150 are engaged by the keyhole slots 154 to hold the stop 148, and consequently the seat frame 70 on the seat suspension 66 by retaining each of the shafts 142 within the associated receiver cups 140. Further, when the seat frame 70 is depressed against the bias of the seat suspension 66, the cable 150 flexes to enable the stop 148 to move downwardly with respect to the suspension base 68. However, upon downward movement of the stop 148 and the cable 150, the enlarged ends 152 are maintained within the keyhole slots 154 by any suitable mechanism to prevent the inadvertent disengagement of the cable 150 from the keyhole slots 154 to keep the stop 148 positioned within the loop created by the cable 150 and the seat pan 68, providing an a safety feature for the seat suspension 66.

The frame rail 70 further includes a support brace 156 (FIGS. 2–4 and 15) that is connected between each of the side members 92 between the crossbeam 134 and the front member 90. The support brace 156 is fixedly attached to each of the side members 92 and functions to provide various attachment points for the seat cushion 54 to the seat frame 70, as well as to improve the overall rigidity and stability of the seat frame 70.

Looking now at FIGS. 8–13, the components of the seat suspension 66 are shown in more detail. The suspension 66 includes an actuating mechanism that can be any suitable force-directing mechanism, but is preferably a bellcrank 158 mounted to the suspension base 68 opposite the third handle 64. The bellcrank 158 includes a pair of supports 160 secured to the seat pan 68 and a bellcrank pivot rod 162 extending between the supports opposite the suspension base 68. The supports 160 can be formed integrally as part of the suspension base 68, or can be separate members fixed to the suspension base 68, or can be formed as a combination thereof, with supports 160 being formed on the suspension base 68, and a pair of braces 161 (FIG. 15) fixed to the supports 160 opposite the pivot rod 162 to enhance the functioning of the bellcrank 158. In the embodiment shown in FIGS. 8–10, the pivot rod 162 is fixedly attached to a pair of roller supports 164 that extend outwardly from the rod 162 and support, preferably rotatably, a bellcrank roller 166 therebetween. The roller 166 rotates freely or can be fixed between the roller supports 164 and is positioned directly beneath the crossbeam 134 such that the roller 166 is engaged with the lower lip 138 of the crossbeam 134. The roller supports 164 also are attached to a pull rod 168 that extends between the supports 164 and is spaced from the roller 166 and pivot rod 162. One end of the pull rod 168 is connected to a first spring 170 which extends perpendicularly from the pull rod 168 towards the third handle 64. Opposite the pull rod 168, the first spring 170 is secured to a post 172 extending upwardly from the suspension base 68. The first spring 170 can be any suitable biasing member, but preferably is a coil spring that includes a pair of hooks 174 and 176 on opposite ends of the spring 170 to enable the spring 170 to be fixedly and reliably attached to each of the pull rod 168 and post 172. The hooks 174 and 176 are formed on each end of the spring 170 in order to aid in forming a low height suspension 66. The pull rod 168 is also engaged with one end of a transfer rod 178 that is engaged with the pull rod 168 between the roller supports 164.

In a second embodiment of the bellcrank 158 shown in FIGS. 15–19, the pivot rod 162 still extends between the supports 160, but instead of a single pair of roller supports 164, the rod 162 is connected to two spaced pairs of roller support arms 165 and a pair of pull arms 167 disposed between the pairs of roller support arms 165. Each pair of roller support arms 165 supports a roller 166 therebetween which is positioned directly beneath and in engagement with the lower lip 138 of the crossbeam 134. The pull arms 167 extend outwardly from the pivot rod 162 at an angle with regard to the supports arms 165, preferably less than ninety (90) degrees, with one pull arm 167 engaging the hook 174 on the first spring 170 and the other pull arm 167 engaging one end of the transfer rod 178. The pull arms 167 can include low-friction bearings 169 disposed between the arms 167 and the hook 174 and transfer rod 178, respectively, in order to enhance the ease of movement of the arms 167, hook 174 and rod 178 with respect to one another and to reduce wear on these parts.

Regardless of the bellcrank 158 embodiment utilized, the bellcrank 158 is preferably used due to the ability to size the bellcrank 158 as needed to meet the height requirements for the suspension 66. This is because, due to the configuration of the seat suspension 66 of the present invention, the SIP of the seat can be located approximately two hundred-fifty (250) mm above the floor of the vehicle at mid ride or mid suspension travel and in a particularly preferred embodiment approximately about two hundred (200) mm above the floor of the vehicle at mid ride or mid suspension travel. In a particularly preferred embodiment, the bellcrank 158 has a size of approximately 2½ inches from the bellcrank roller 166 to the pivot rod 162 and 2 inches from the pull arms 167 or the pull rod 168 to the pivot rod 162. With this particular construction, the suspension 66 has a sixty (60) mm maximum suspension stroke, which can be varied between forty (40) mm and eighty (80) mm by varying the dimensions of the bellcrank 158 and a transfer arm 180.

Figure 16:
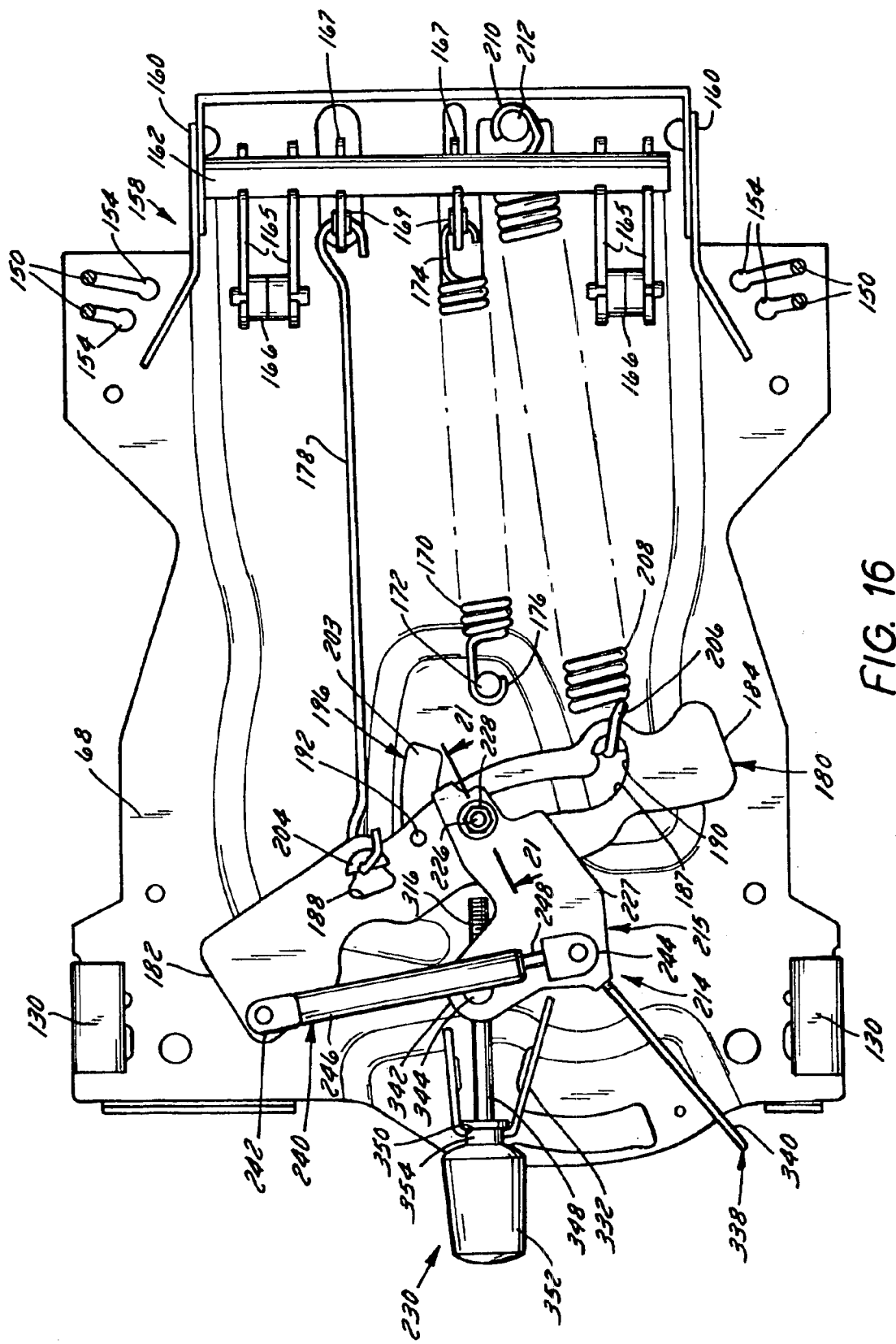
FIG. 16 is a top plan view of the suspension of FIG. 15 in a high weight occupant position.

In each embodiment of the bellcrank 158, the transfer rod 178 extends from the pull arm 167 or pull rod 168 over the suspension base 68 and engages a transfer link or arm 180 opposite the pull arm 167 or pull rod 168. The transfer arm 180 is a generally elongate, rigid member having a first end 182, a second end 184 and an elongate notch 186 (FIGS. 9 and 12–13) or slot 187 (FIGS. 16–19) positioned adjacent the second end 184 which function in an identical manner. The transfer arm 180 also includes a first slot 188 positioned between the elongate notch 186 or slot 187 and the first end 182 and a second slot 190 positioned adjacent the second end 184, which can also be formed as one end of the elongate slot 187 opposite the first slot 188, as best shown in FIG. 16.

Figure 20:
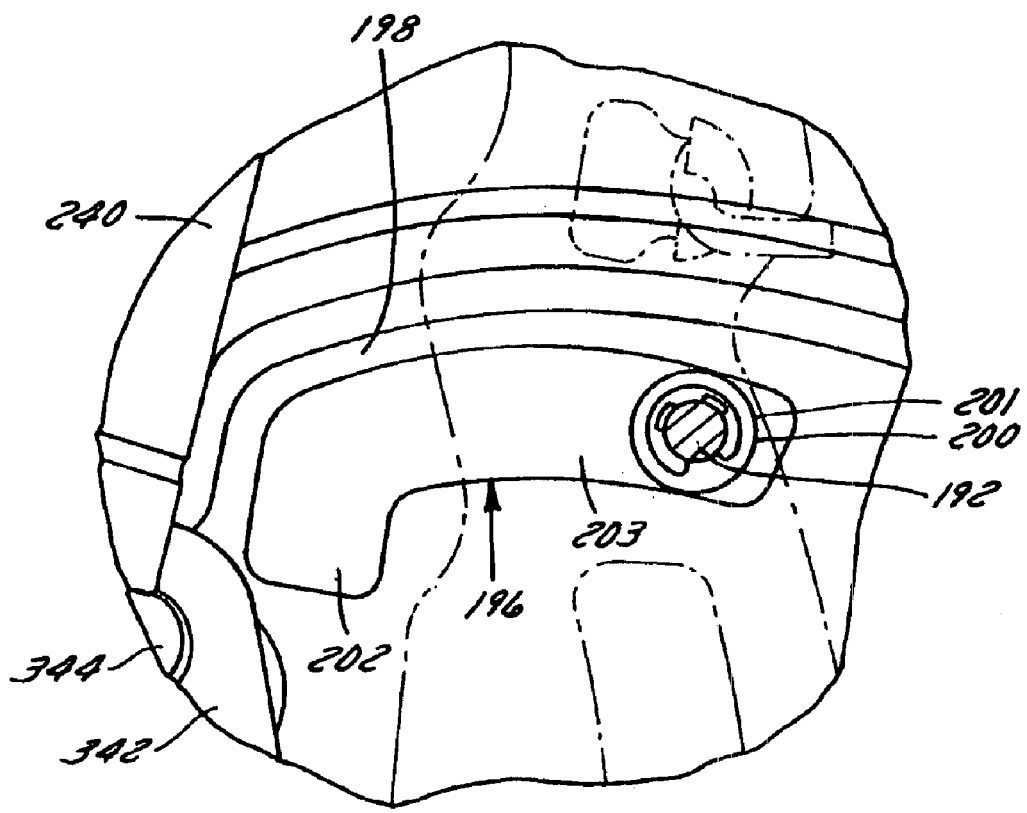
FIG. 20 is a circular cross-sectional view along line 20—20 of FIG. 19.
Figure 21:
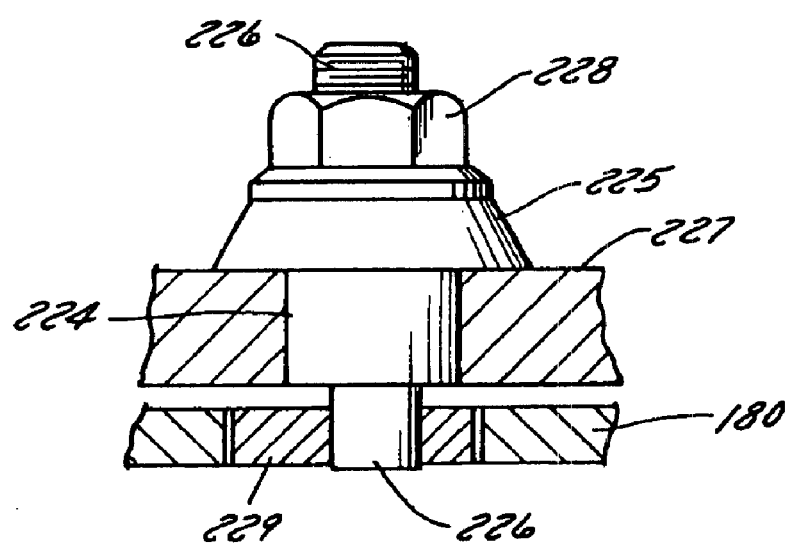
FIG. 21 is a partially broken away cross-sectional view along line 21—21 of FIG. 16.

The transfer arm 180 is movably connected to the suspension base 68 by a rigid glide pin 192 fixed within an opening 194 in the transfer arm 180 between the first slot 188 and the elongate slot 186. As best shown in FIG. 20, the glide pin 192 extends downwardly from the transfer arm 180 into a curved track 196, preferably formed in a raised portion 198 of the suspension base 68. The glide pin 192 is preferably engaged within the track 196 by a bearing 200 positioned on the glide pin 192 and including a peripheral flange 201 engaged with opposite sides of the track 196. The bearing 200 and flanges 201 are preferably formed of a low-friction material such that the glide pin 192 can slide easily with respect to the track 196, in order to allow the transfer arm 180 to move along the track 196. Furthermore, the track 196 has a specifically defined arcuate shape with a first curved portion 202 and a second curved portion 203 that has a different radius of curvature than the first portion 202 for reasons to be described.

Referring now to FIGS. 8, 9 and 16–19, to properly connect the transfer arm 180 to the transfer rod 178, the end of the transfer rod 178 opposite the pull rod 168 engages a bearing 204 that is inserted through the first slot 188 on the transfer arm 180 to hold the transfer rod 178 in engagement with the transfer arm 180. The bearing 204 engaged with the transfer rod 178 has a shape that is insertable through the first slot 188 and that serves to prevent the disengagement of the transfer rod 178 from the transfer arm 180, as well as to align the rod 178 with the arm 180 and allow the rod 178 to rotate with respect to the arm 180.

Opposite the transfer rod 178, the second slot 190 is engaged with a hook 206 disposed on one end of a second spring 208. The second spring 208 can be formed similarly to the first spring 170 and extends from the second slot 190 in the transfer arm 180 towards the bell crank 158 and is secured to a post 212 formed on and extending upwardly from the suspension base 68 adjacent the bell crank 158 by the engagement of another hook 210 disposed opposite hook 206. The hooks 206 and 210 are present on the second spring 208 to assist in reducing the height of the suspension 66. Further, the second spring 208 is positioned generally level with the first spring 170 to even further reduce the overall height of the suspension 66.

The transfer arm 180 is also connected to a weight adjustment mechanism 214 that extends between the transfer arm 180 and the third handle 64. As best shown in FIGS. 8–9 and 11–13, a first embodiment of the mechanism 214 includes a weight adjust arm 215 having a handle link 216 pivotally secured to a pivot 218 disposed on and extending upwardly from the suspension base 68 at one end and to the third handle 64 at the opposite end. The pivot 218 is also connected to one end of a plate assembly 219 comprising a part of the weight adjust arm 215 and including an upper weight adjust plate 220 that is positioned on the pivot 218 on one side of the handle link 216. The upper plate 220 extends away from the pivot 218 and includes a pivot pin opening 224 opposite the pivot 218. The opening 224 in the plate 220 is aligned with the elongate notch 186 in the transfer link 180 such that a pivot pin 226 can be inserted through the opening 224 and the elongate notch 186. The pivot pin 226 is fixed in any conventional manner, such as by mechanically fastening, adhering or welding, to the upper plate 220 to maintain the pin 226 within the elongate slot 186 in order to enable the pin 226 to function as a pivot point for the transfer link 180 when the suspension 66 is in operation. Thus, because the upper plate 220 is fixed to the handle link 216 to form the weight adjust arm 215, with the plate 220 and the link 216 being rotatable about the pivot 218, movement of the third handle 64 relative to the suspension base 68 and pivot 218 also moves the pivot pin 226 along the elongate notch 186. Further, the pin 226 can include a flange 222 or other suitable securing member fastened to the pin 226 opposite the upper plate 220 on the other side of the transfer arm 180. The flange 222 maintains the transfer arm 180 and notch 186 between the flange 222 and the upper arm 220 such that the pin 226 is maintained in alignment with the notch 186. The flange 222 can also be formed as a lower plate (not shown) mounted to the pivot 218 below the link 216 opposite the upper plate 220 and including an opening (not shown) through which the pin 226 can be inserted and secured. Further, in a particularly preferred embodiment, the opening 224 in piece 227 is hexagonally shaped to receive a hexagonally shaped pin section 229 that more effectively transfers torque on the pin 226 to the piece 227 to hold the pin 226 stationary.

Alternatively, as best shown in FIGS. 15–19 and 21, the flange 222 can be omitted and the weight adjust arm 215 can be formed of the upper plate 220 and the handle link 216 which are formed as an integral piece 227 of a rigid material. In this embodiment, the pin 226 is still inserted through the opening 224 and a boss 225 formed on the piece 227 around the opening 224. The opening 224 is positioned in alignment with the slot 187, and is secured in the same manner used when the plate 220 and flange 222 are present, such as by welding or by securing a nut 228 to the pin 226 over the boss 225 opposite the slot 187.

In either embodiment, a bearing 229 formed similarly to bearing 200 is preferably positioned disposed within the elongate notch 186 or slot 187 such that the pivot pin 226, when positioned in the elongate notch 186 or slot 187 is also inserted through the bearing 229 to enable the pin 226 to slide more easily with respect to the notch 186 or slot 187.

Figure 11:
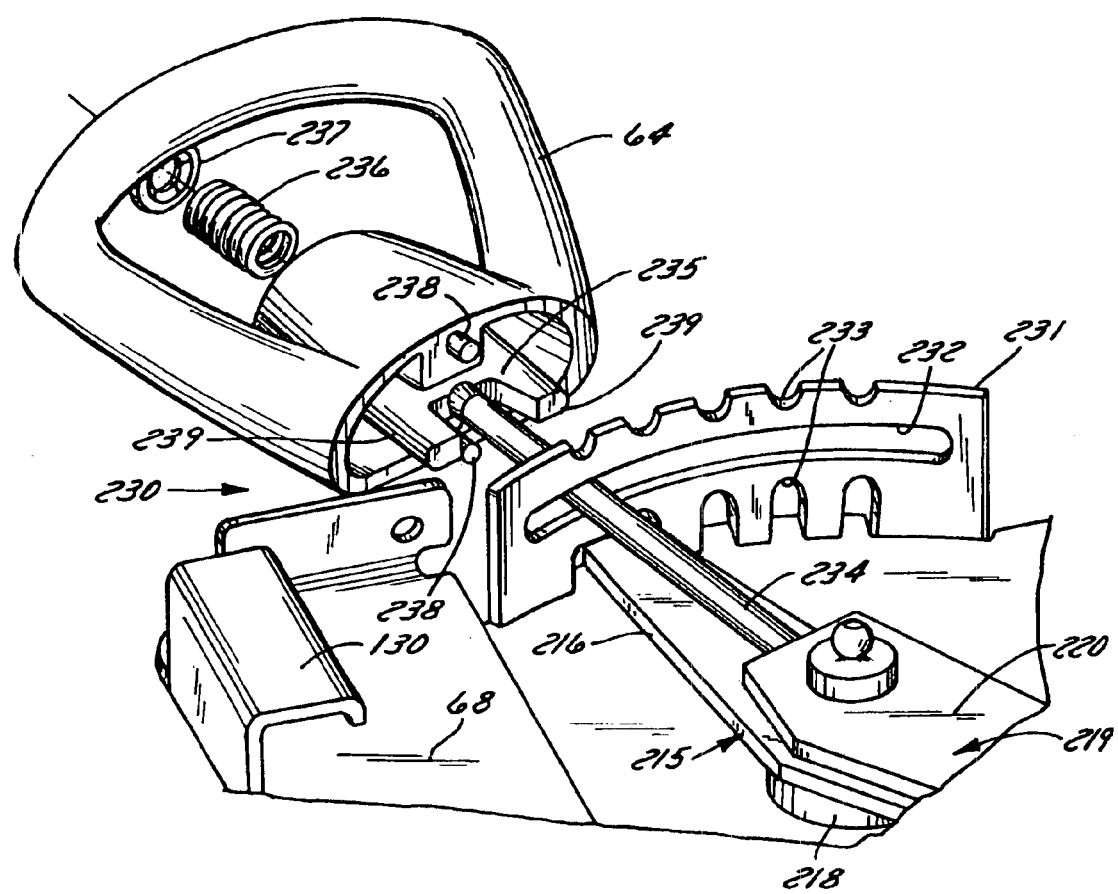
FIG. 11 is a partially broken away isometric view of the weight adjustment mechanism of the seat suspension of FIG. 9.
Figure 12:
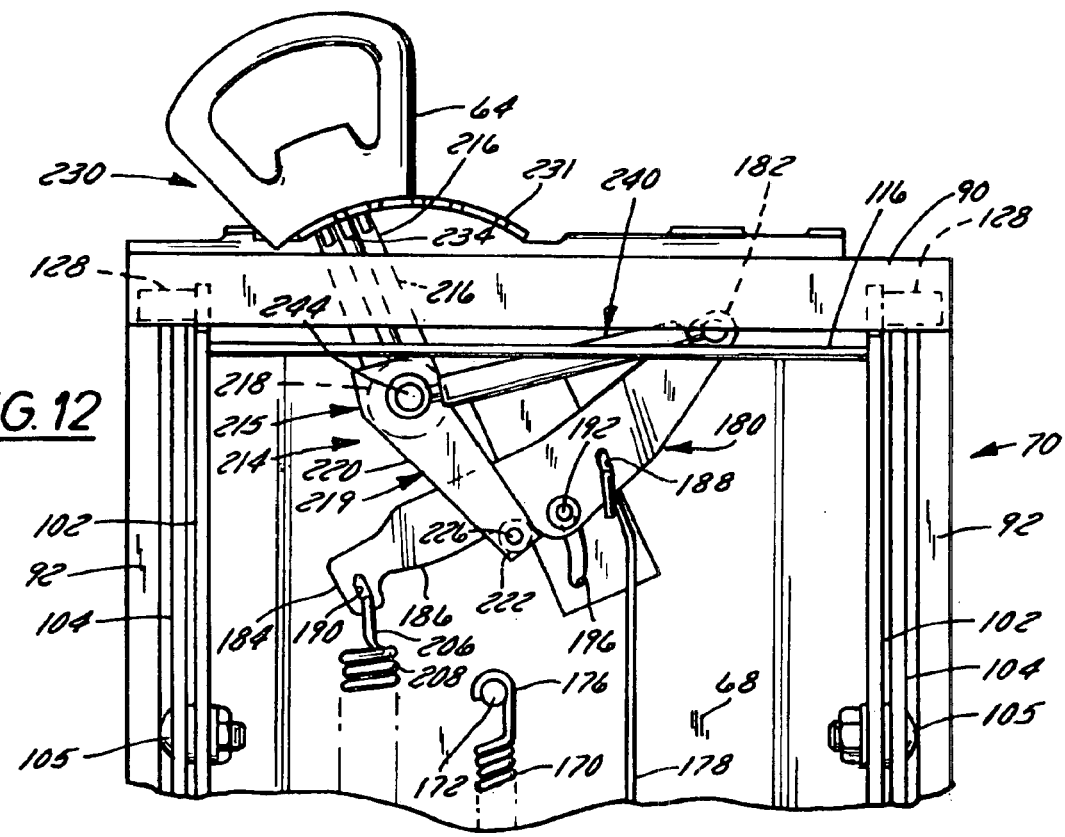
FIG. 12 is a partially broken away top plan view of the seat suspension of FIG. 9 with the weight adjustment mechanism in a high weight occupant position.
Figure 13:
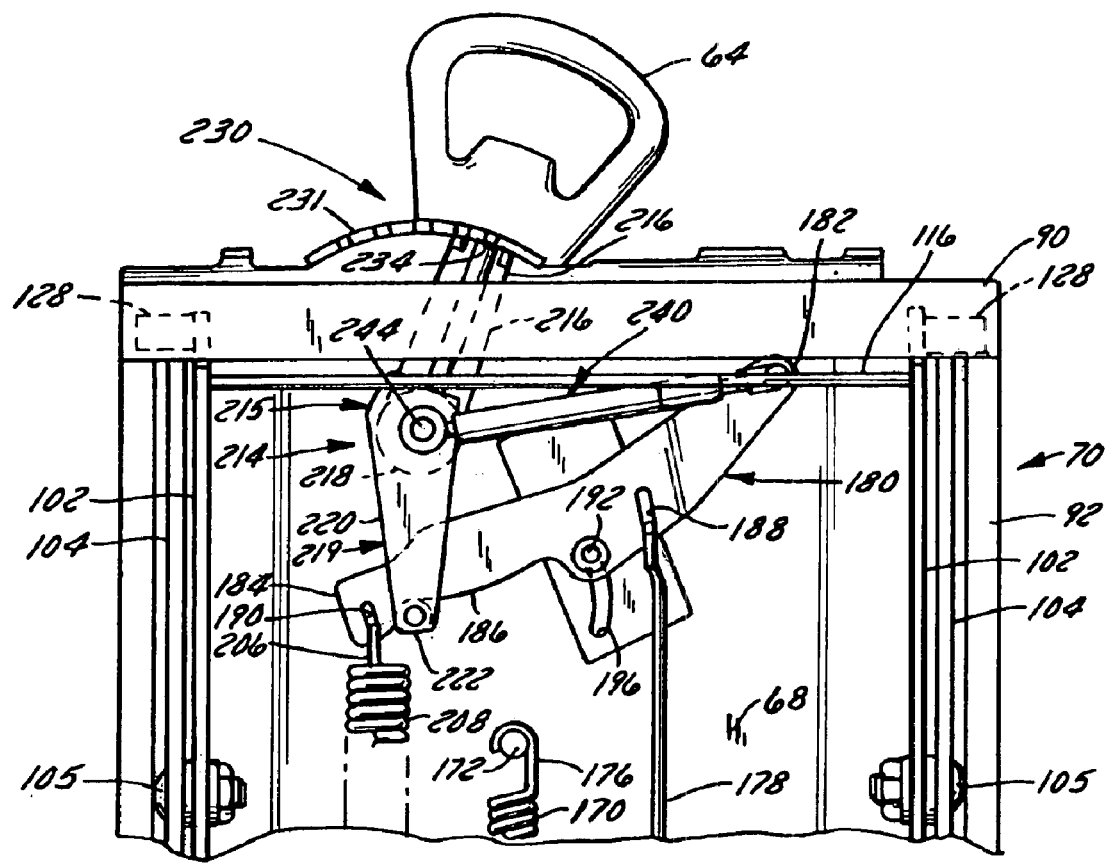
FIG. 13 is a partially broken away top plan view of the seat suspension of FIG. 9 with the weight adjustment mechanism in a low weight occupant position.

The movement of the handle 64 to operate the weight adjust mechanism 214 is controlled by a positioning and locking mechanism 230 is disposed on the third handle 64 to position the handle 64 and weight adjust arm 215 at a location on the suspension base 68 wherein the pivot pin 226 is located at a point within the notch 186 or slot 187 to provide a desired amount of resistance from the suspension 66 to movement of the seat frame 70. More specifically, a first embodiment of the mechanism 230, as best shown in FIGS. 11–13, includes a curved plate 231 disposed on and extending upwardly from the suspension base 68 adjacent the end of the handle link 216 opposite the pivot 218. The plate 231 includes a central, elongate horizontal channel 232 and a number of pairs of opposed vertical indents or notches 233 disposed along and on opposite sides of the channel 232. A rod 234 is fixed to and extends from the link 216 through the channel 232 and is engaged with the third handle 64. To engage the handle 64 with the rod 234, opposite the link 216, the rod 234 is inserted through an opening in a base 235 for the handle 64 in the handle 64. The base 235 includes a coil spring 236 disposed in a slot (not shown) opposite the base 235 through which the rod 234 is inserted. Past the spring 236, the rod 234 is secured to a washer 237 that is engageable with the spring 236 opposite the base 235. The presence of the spring 236 enables the handle 64 to be pulled outwardly away from the curved plate 231 against the bias of the spring 236 in order to disengage a pair of stops 238 disposed on the base 235 on opposite sides of the rod 234 from a pair of notches 233 on the plate 231. After the stops 238 are withdrawn from the notches 233, the rod 234 and handle 64 can be slid and guided along the channel 232 by a pair of guides 239 positioned on the base 235 on opposite sides of the rod 234 between the stops 238. The position of each pair of notches 233 on the plate 231 corresponds to a position of the pivot pin 226 within the slot 186 at a position where the suspension 66 provides support to the seat frame 70 proportional to a specified weight for an occupant of the seat 50, which can be displayed on the exterior of the plate 231. Once the desired pair of notches 233 are aligned with the stop 238, the handle 64 can be released such that the spring 236 urges the handle 64 towards the plate 231 and engages the stops 238 in the notches 233.

The mechanism 230 can also take the form shown in FIGS. 14–19. In this second embodiment for the mechanism 230, the mechanism 230 includes a generally U-shaped bracket 332 positioned on the suspension base 68 adjacent the unitary piece 227 forming the arm 215. The piece 227, as stated before, is formed as a single piece of material including the opening 224 through which the pivot pin 226 is inserted and secured therein by a nut 228. The piece 227 also includes an indicator 338 formed of an elongate rod 340 extending outwardly from the piece 227 on the side of the pivot 218 opposite the pivot pin 226. The position of the indicator 338 allows the occupant to know what weight the suspension 66 is set for based upon indicia (not shown) placed on the suspension base 68 below or above the indicator 338.

Between the pivot 218 and the opening 224, the piece 227 includes an extension 342 in which is disposed a channel (not shown) having a cylindrical nut 344. The nut 344 engages a threaded end 346 of a jack screw 348 that extends between the nut 344 and the bracket 332. The screw 348 extends opposite the threaded end 346 through an opening 350 in the bracket 332 and is connected to a handle 352 opposite the threaded end 346. Between the handle 352 and the bracket 332 is disposed a floating bearing 354 fixes the jack screw 348 on the bracket 332 but that, in conjunction with the nut 344, also enables the jack screw 348 to move angularly and/or vertically when the jack screw 348 is rotated to pivot the piece 227 on the pivot 218 and adjust the position of the pivot pin 226 within the slot 187.

In either embodiment, very little effort is required to move the handle 64 or 352 of the adjustment mechanism 230 due to configuration of the components of the mechanism 230 and the suspension 66. More specifically, because the mechanism 230 changes the mechanical advantage of the second spring 208 by moving the pivot pin 226 without significantly increasing or decreasing the length of the spring 208, little force is required to move the mechanism 230 and pin 226.

Looking now at FIGS. 8–9 and 12–13 and 15–19, the suspension 66 also includes a damper 240 connected between the pivot 218 and the first end 182 of the transfer link 180. The damper 240 includes a pair of connectors 242 and 244 that are rotatably fixed to the pivot 218 and to the first end 182 of the transfer link 180, respectively, in any suitable or conventional manner. The positioning of the damper 240 in this manner enables the velocity of the damper 240 to be varied proportionally to the suspended mass acting on the suspension 66 in a manner to be described. Further, the damper 240 can be any conventional non-adjustable rate damper, with the connector 242 secured to an elongate cylinder 246 extending outwardly from the connector 242, and the connector 244 including a rod 248 extending into the cylinder 246, or vice versa. The movement of the cylinder 246 and rod 248 with respect to one another is controlled by the presence of a gas or fluid within the damper 240, in a manner which is well known in the art, such that the damper 240 extends or contracts at an approximately fixed rate. However, while the damping rate of the damper 240 used is non-adjustable, the particular damping rate of the damper 240 employed can be selected in order to provide a damping rate for the suspension 66 that accommodates the design and use proposed for the suspension 66.

Figure 17:
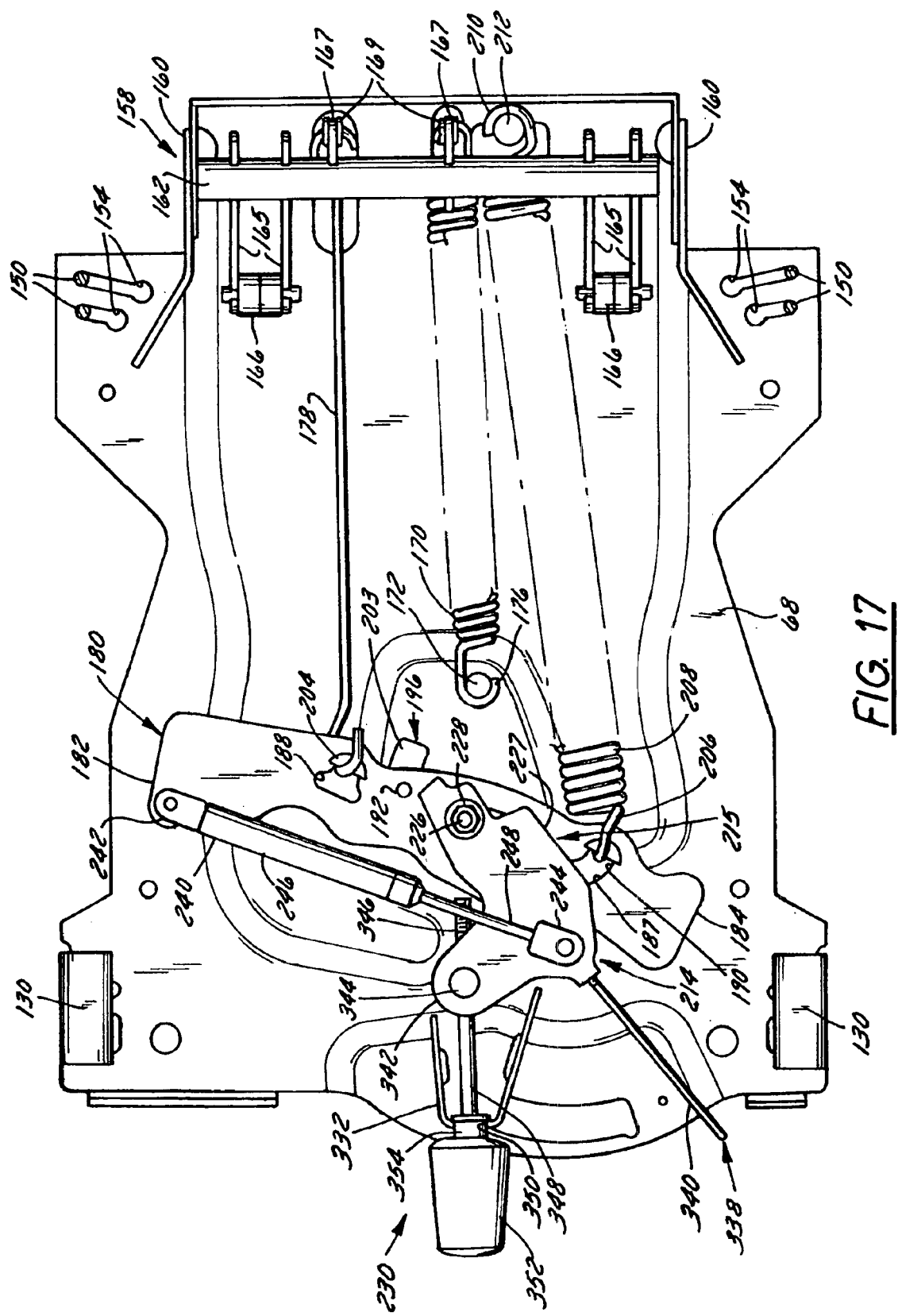
FIG. 17 is a top plan view of the suspension of FIG. 16 in a deflected position.
Figure 18:
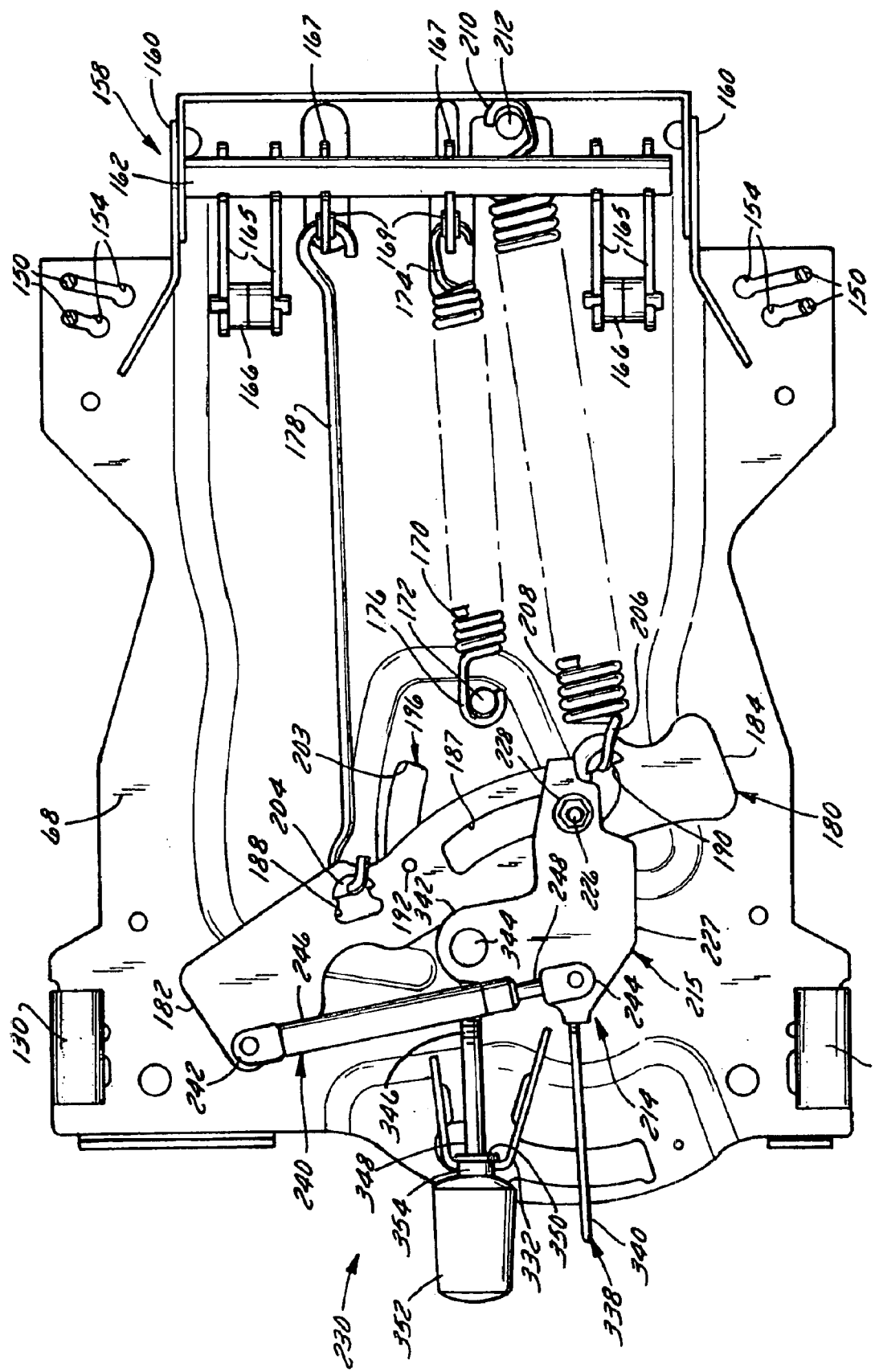
FIG. 18 is a top plan view of the suspension of FIG. 15 in a low weight occupant position.
Figure 19:
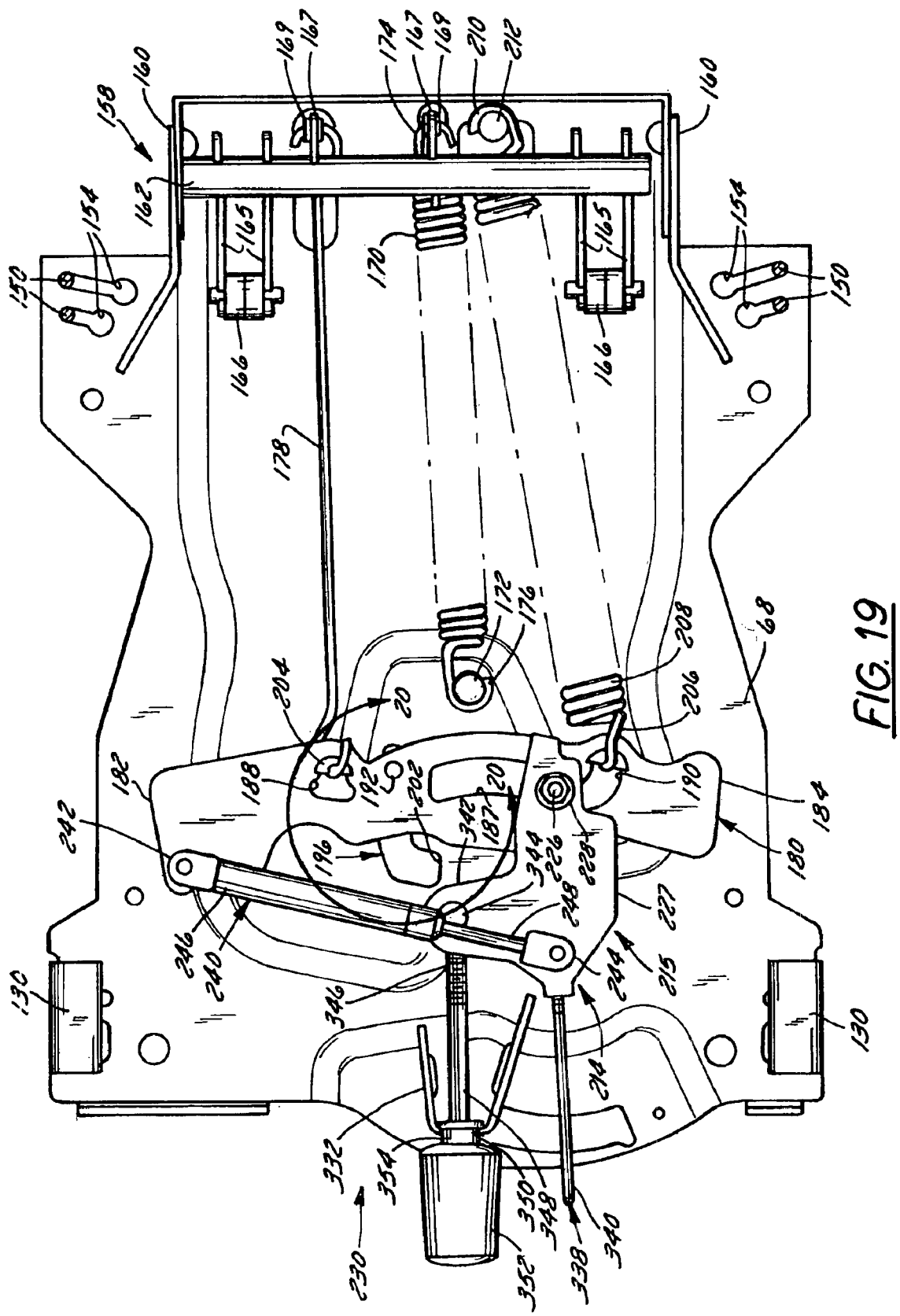
FIG. 19 is a top plan view of the suspension of FIG. 18 in a deflected position.

The amount of damping provided by the damper 240, or the damping rate, is adjusted by the movement of the weight adjustment mechanism 214 through the operation of the third handle 64. More specifically, when the weight adjustment mechanism 214 is moved by the handle 64 or jack screw 348 to a low weight setting as shown in FIGS. 13 and 18–19, the arm 215 is pivoted such that the pivot pin 226 moves towards the second end 184 of the transfer link 180. This decreases the effective stroke and rod velocity of the damper 240, thereby decreasing the effective damping rate of the damper 240. Conversely, when the third handle 64 is moved to a high weight position, as shown in FIGS. 12 and 16-17, the arm 215 moves the pivot pin 226 away from the second end 184. This increases the length of the rod 248 exposed from within the cylinder 246 when the suspension 66 is completely collapsed, thereby increasing the available stroke and rod velocity for the damper 240 and the associated damping rate.

Stated another way, the bellcrank 158, because it maintains the rollers 166 in constant contact with the cross beam 134 and seat frame 70, is able to rotate through a certain maximum number of degrees. For example, in the present invention where the suspension 66 is capable of about sixty (60) mm of maximum travel, it means that the bellcrank 158 is capable of rotating through a maximum angle of approximately fifty-four (54) degrees of movement. This means that the transfer rod 178 is always going to be capable of moving through a set maximum amount of linear travel. Because the pivot point 226 for the transfer link 180 changes during weight adjustment, the transfer link 180 will not always rotate through the same maximum number of degrees or maximum degree range. It will have a greater maximum angular range of rotation when the suspension 66 is set at its highest weight adjust setting and will have a lesser maximum angular range of rotation when the suspension 66 is at its lowest weight adjust setting. Specifically, when the transfer link pivot pin 226 is located closer to be transfer rod 178, the transfer link 180 will have a greater maximum angular range of rotation. As the pivot pin 226 is moved away, such as when the handle 64 is positioned in the low weight occupant position, the maximum angular range through which the transfer link 180 can rotate is reduced. Because of this relationship, both the damper 240 and the second spring 208 are going to have less linear travel when the suspension 66 is set in the low weight adjust position as compared to the high weight adjust position. These characteristics provide a different effective spring rate and a different effective damping rate for the suspension 66 both depending on the particular weight adjust setting selected. For example, in the high weight adjust position for a preferred embodiment of the suspension 66, the damper 240 has a maximum stroke of approximately 1½ inches. In the low weight adjust position, the damper 240 has a maximum stroke of about ¾ inch. Because the damper 240 is capable of moving through a smaller distance in the same amount of time when the seat suspension 66 is set in the low weight occupant position, it will put out less damping force, as this is velocity dependent, and hence will have a lower effective damping rate than when the suspension 66 is in the high weight occupant position. The point of attachment of the damper 240 to the ground could be located elsewhere than on the pivot 218, but the pivot 218 is primarily for convenience as there is already mounting point to ground at that location. As result, the pivot 218 serves two functions: (1) to anchor and provide a pivot point for the weight adjust arm 215, and (2) to anchor and provide a pivotable point of attachment for the damper 240.

The key to the effectiveness of the differences in length that the damper 240 moves between the maximum low weight and maximum high weight positions is the ratio of linear travel that the damper 240 experiences between the maximum low weight adjust setting and the maximum high weight adjust setting. More specifically, the seat suspension 66 is constructed to have a desired ratio of the maximum stroke of the damper 240 in the high weight adjust position divided by the maximum stroke of the damper 240 in the low weight adjust position. Preferably, the choice of the lengths of the components of the suspension 66, namely the transfer link 180, the weight adjust arm 215, as well as other components, along with the damping rate of the damper 240 and its own physical maximum stroke or travel, are selected to provide such a desired ratio.

Stated more simply, in order to achieve the desired ratio, the damping rate of the damper 240 and the ratio of how far the damper 240 can travel when the suspension is set in the maximum weight position to how far the damper 240 can travel when the suspension is set in the minimum weight position are selected so as to insure a suspension damping rate that is experienced by the seat operator varies proportionally/in accordance with the suspended mass acting on the suspension 66. This ratio is preferably represented by the following equation:

$$R=(1+3*r)/(3+r)$$

where R represents the ratio of masses between the high weight occupant and the low weight occupant and r is a ratio of the maximum damper stroke in the high weight and low weight positions. For example, when using the above equation in a preferred embodiment of the suspension 66, the parameters for the suspension 66 are normally selected so as to ensure that the effective system damping rate for a suspended mass of 60 kg will be half as much as the system damping rate for a suspended mass of 120 kg. Preferably, these parameters are selected to provide a linear or proportional relationship between suspended mass acting on the suspension and the system damping rate. In a further preferred embodiment, the parameters are selected so as to provide a system damping rate for the suspension 66 that varies within ±15 percent of being linear relative to suspended mass acting on the suspension.

In a particularly preferred embodiment of the invention, the suspension 66 is designed to accommodate a 130 kilogram occupant as the highest weight occupant and a 50 kilogram occupant as the lowest weight occupant. While the suspension 66 certainly is capable of accommodating an occupant who weighs more than 130 kg or less than 50 kg, these weights define the maximum and minimum of the weight range for which the seat suspension 66 is capable of providing the appropriate level of vibration isolation for the occupant. However, it is also possible to alter the construction of the suspension 66 to accommodate a different range of occupant weights, such as by scaling the suspension 66 to change the magnitude of the forces applied to the suspension 66 while maintaining the proportional relationship between the forces and the suspended mass acting on the suspension 66. This can be accomplished by varying the characteristics of various components of the suspension 66, such as the height of the actuating mechanism or bellcrank 158, the length of the transfer link 180 and the weight adjust arm 215, the damping rate of the damper 240 and the spring rates of the first spring 170 and second spring 208 with regard to one another.

In order to utilize the suspension, prior to an occupant sitting on the seat 50, the occupant moves the third handle 64 and weight adjust arm 215 to position the pivot pin 226 within the elongate notch 186 or slot 187 at a location corresponding to the desired weight adjustment position for the occupant. The third handle 64 is positioned in this manner by sliding or rotating the handle 64 to the appropriate position in the manner described previously.

After the third handle 64 is located at the appropriate position, the occupant can then sit on the seat cushion 54 of the seat 50. As the occupant places his or her weight on the seat cushion 54, the seat frame 70 and scissors linkages 100 are urged downwardly due to the weight of the occupant as best shown in FIGS. 3–4. The downward movement of the seat frame 70 urges the lower lip 138 of the crossbeam 134 against the bellcrank roller(s) 166 to transmit the force of the occupant to the bellcrank 158, thereby, pivoting the roller 166 and roller supports 164 or roller arms 165 with respect to the pivot rod 162. The pivoting of the supports 164 also pivots the pull arms 167 or pull rod 168 towards the rear of the seat pan 68. The movement of the pull arms 167 or pull rod 168 in this direction opposes the bias of the first spring 170 secured to the pull arms 167 or pull rod 168, thereby applying the preload to the suspension 66.

Referring now to FIGS. 12–13 and 15–19, the movement of the pull arms 167 or the pull rod 168 also moves the transfer rod 178 rearwardly, thereby pivoting the transfer link 180 with respect to the pivot pin 226. Depending on the particular position of the pivot pin 226 within the elongate notch 186 or slot 187, the movement of the transfer link 180 about the pivot pin 226 pulls against the bias of the second spring 208, and extends the damper 240 a specified amount. For example, as discussed previously, when the pivot pin 226 is positioned in a low weight occupant position within the slot 186, the pin 226 is located adjacent the second spring 208, such that a decreased spring rate is supplied by the second spring 208, and a decreased amount of damping is provided by the damper 240. Alternatively, when the pin 226 is located in a high weight position in the notch 186 or slot 187 opposite the spring 208, any movement of the transfer link 180 results in a large spring rate supplied by the second spring 208, and a high damping rate provided by the damper 240. More specifically, the number of degrees that the transfer link 180 can pivot or rotate is limited by position of the pivot pin 226 determined by position of the handle 64, i.e., the weight adjust setting of the suspension 66. The transfer link 180 rotates through what ever number of degrees is appropriate for the current weight adjust setting and imparts a generally linear movement, i.e. stretching, to the second spring 208 and causes the rod 248 of the damper 240 to extend outwardly from the cylinder 246. Further, based on the configuration of the track 196 with each curved portion 202 and 203, the track 196 can direct the transfer link 180 in a purely arcuate or rotational direction about the pivot pin 226. More specifically, regardless of the position of the pin 226, the form of the track 196 ensures that the transfer link 160 moves only by rotating around the pin 226 when the suspension 66 operates. This configuration for the track 196 thus directs all of the force exerted by the damper 240 and second spring 208 into resisting the movement of the bellcrank 158 and seat frame 70.

The first spring 170, as stated above, provides a preload to the suspension 66. The first spring 170 also provides a base amount of suspension force. Preferably, the characteristics of the spring 170 are selected so as to be able to provide all of the suspension force that supports the lowest weight seat occupant. The first spring 170 is also preferably selected so as to provide all of the suspension force without requiring any assistance from the second spring 208, when a seat occupant having a weight equal to or about equivalent to the lowest weight seat occupant for which the suspension was designed sits on the seat 50. Thus, preferably, the second spring 208 does not provide any suspension force for a seat occupant having a weight that is the same as the lowest weight for which the seat suspension 66 was designed. In reality, the second spring 208 provides some suspension force for the case of a low weight seat occupant or operator. However, the amount of this force is minimized by placing the pivot pin 226 as close to the point of attachment of the second spring 208 to the transfer link 180 as is possible.

Similarly to the selection of the damper 240 to provide the appropriate damping rate, the spring constants for both springs 170 and 208 are selected to provide the desired suspension spring rate. In a particularly preferred embodiment of the suspension 66, the springs 170 and 208 are selected provide a suspension spring rate of thirty (30) pounds per inch for the low suspended mass and fifty-five (55) pounds per inch for the high suspended mass resulting in a spring rate ratio of approximately 1 to 1.8–1.9. However, ratio of the spring rate for the low suspended mass to the spring rate for the high suspended mass can differ from the preferred ratio by as much as ±30% in order to offset less than ideal effects such as increased mechanism friction for the heavier occupant.

In addition to the preferred embodiments of the seat 50 incorporating the suspension 66 discussed previously, other variations of the seat 50 are also contemplated as being within the scope of the present invention. For example, the seat 50 may also include other features and mechanisms, such as a height adjustment mechanism (not shown) in order to move the seat 50 and suspension vertically with respect to the vehicle in order to position the seat 50 at a desired location for a particular occupant. Further, while each of the components of the suspension 66 is preferably formed of a metal, such as steel or aluminum, to provide the required strength and durability for the suspension 66, unless otherwise specified, other rigid materials, such as plastics, are also capable of being used to form each of the components of the suspension 66.

Figure 25:
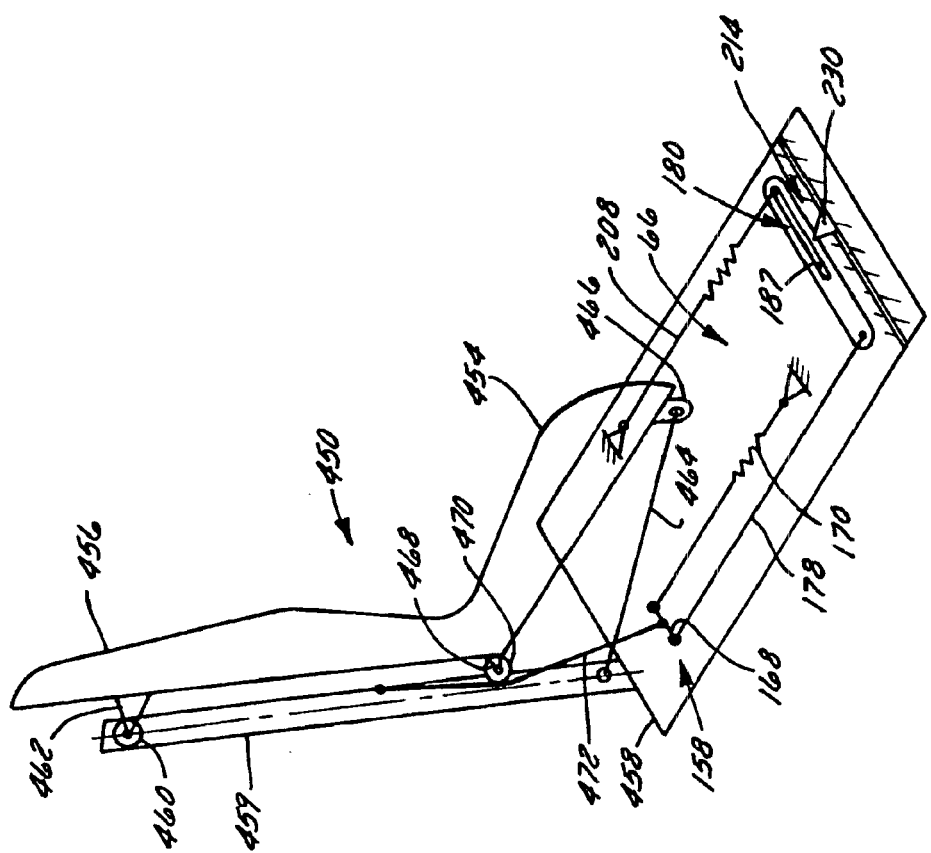
FIG. 25 is a schematic isometric view of the seat suspension of the present invention secured to a vertically movable seat.
Figure 26:
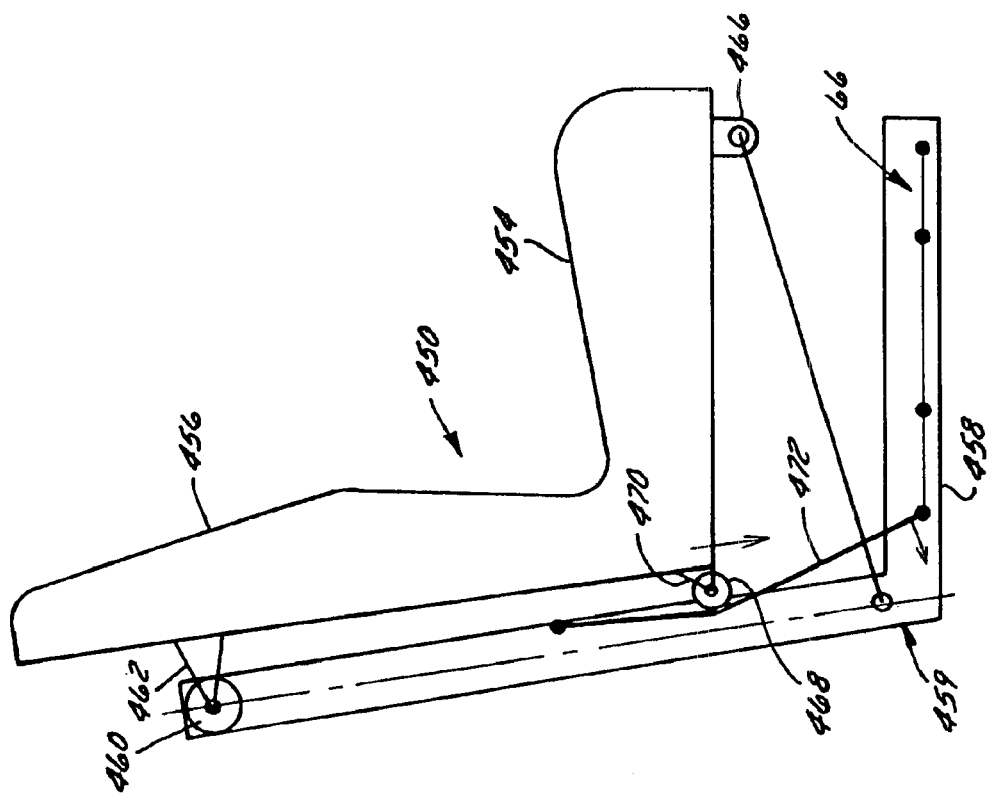
FIG. 26 is a schematic side plan view of the seat suspension and seat of FIG. 25.

Also, as best shown in FIGS. 25–26, the suspension 66 can be connected to a seat 450 having a seat cushion 454 and a backrest 456. The backrest 456 is movably connected to a support 458 having a vertical portion 459 by a first roller 460 movably disposed within the vertical portion 459 and connected to the backrest 456 by a bracket 462. The seat cushion 454 is connected to the vertical portion 459 by a swing arm 464 pivotally connected to and extending between a stay 466 on the seat cushion 454 and the vertical portion 459, and is suspended above the suspension 66 located on the support 458. The position of the seat 450 with regard to the vertical portion 459 is controlled by the engagement of a second roller 468 secured to a bracket 470 on the backrest 456 adjacent the seat cushion 454 with a ramp lever arm 472.

The ramp lever arm 472 is connected between the vertical portion 459 and the pull rod 168 of the suspension 66 that is connected to the spring 170 and the transfer rod 178. The position of the pivot pin 226 can be adjusted within the slot 187 of the link 180 by using the weight adjust mechanism 214 and the positioning and locking mechanism 230.

When an individual sits on the seat 450, the weight of the occupant moves the seat 450 downwardly along the vertical portion 459 such that the second roller 468 urges the ramp lever arm 472 rearwardly towards the vertical portion 459. Movement of the lever arm 472 in this direction moves the pull rod 168 rearwardly as well, such that the suspension 66 is actuated by the rearward movement of the pull rod 168, and the consequent motion of the first spring 170, transfer rod 178 and transfer link 180, which also actuates the second spring 208 and damper 240 (not shown in this embodiment), to oppose the downward movement of the seat 450.

Figure 27:
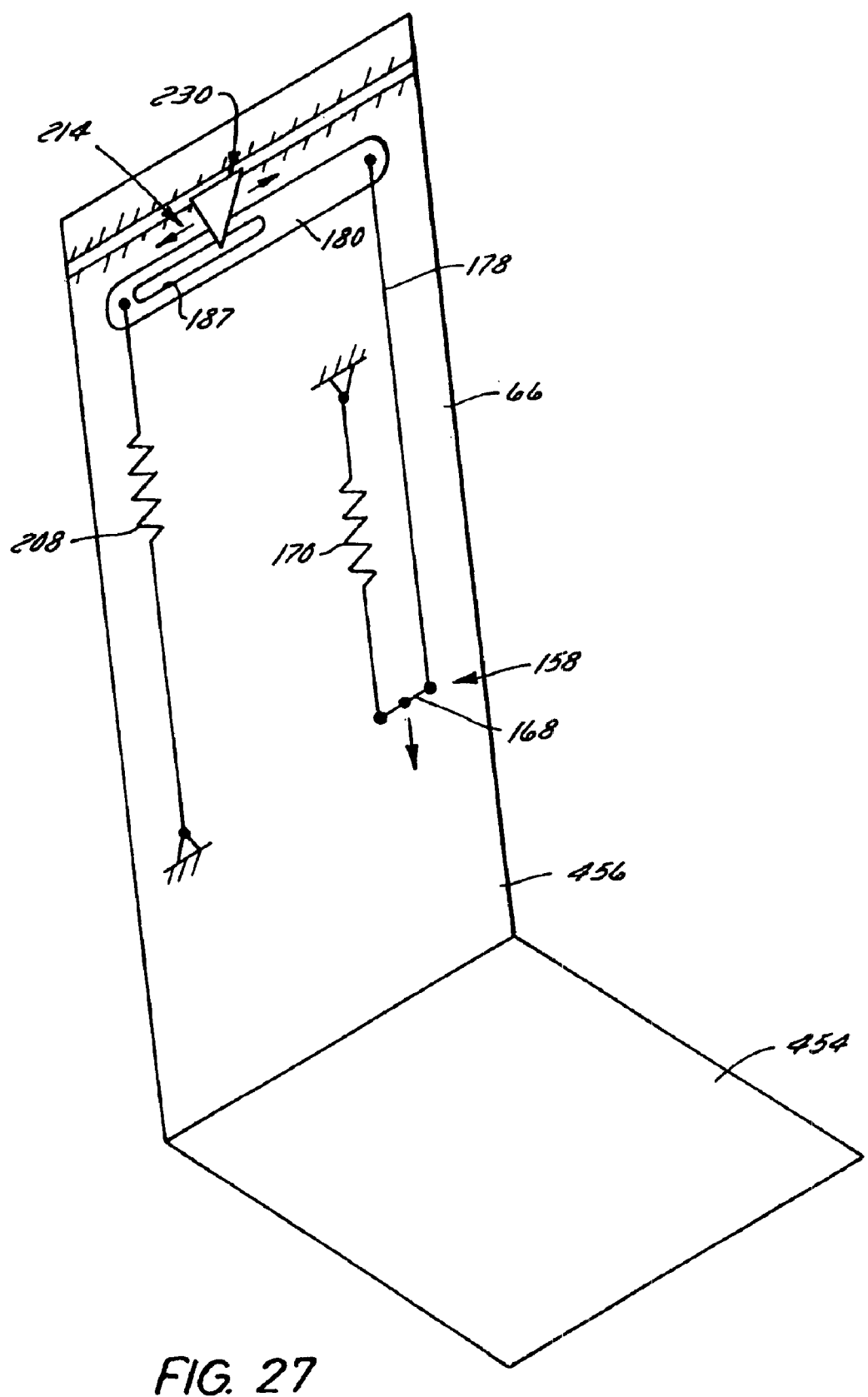
FIG. 27 is a schematic isometric view of the seat suspension of the present invention positioned in a backrest of a seat.
Figure 29:
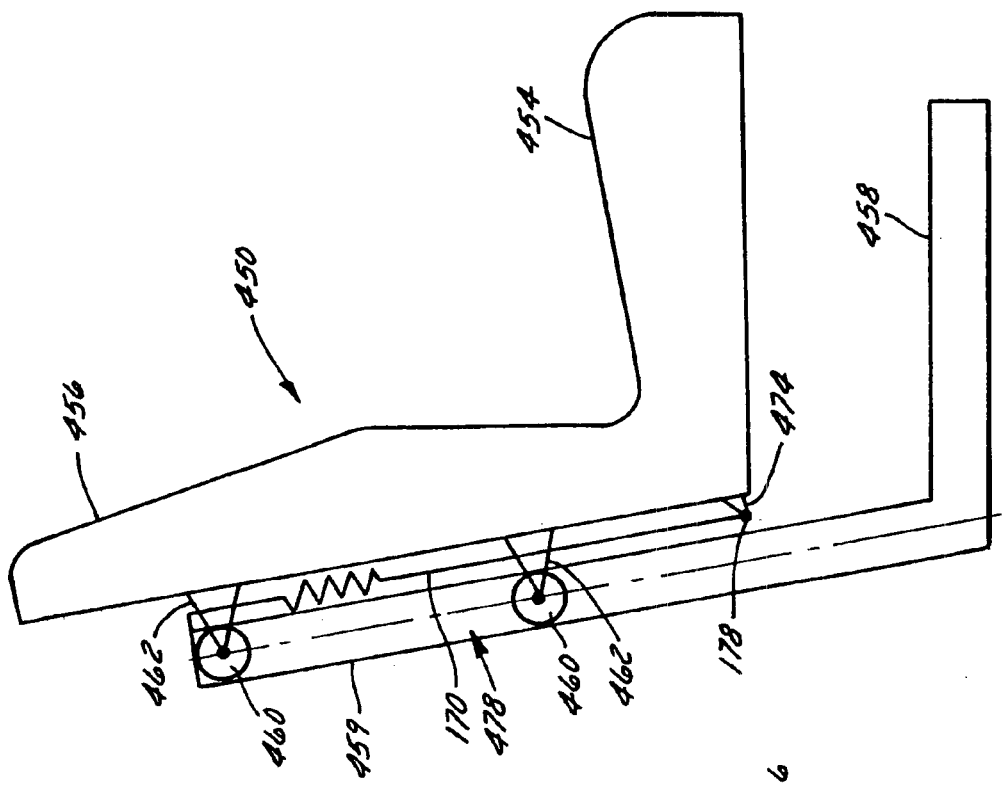
FIG. 29 is a schematic side plan view of a second embodiment of the backrest mounted suspension of FIG. 27.
Figure 28:
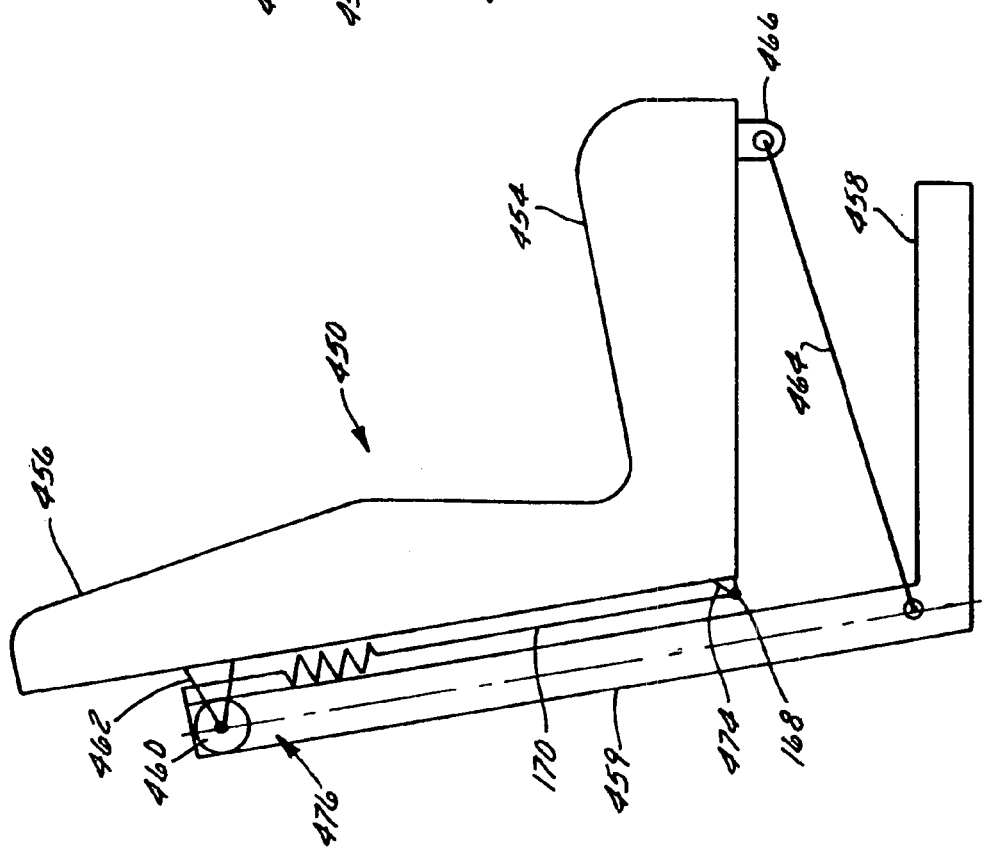
FIG. 28 is a schematic side plan view of a first embodiment of the backrest mounted suspension of FIG. 27.

In still another embodiment of the present invention, the suspension 66 can be positioned in the backrest 56 of the seat 50. The arrangement of this embodiment is schematically shown best in FIGS. 27–29, in which, the suspension 66 is positioned such that the components of the suspension 66 are fixed to the generally vertical portion 459 of the support 458 for the seat 50. The pull rod 168 is mounted to the backrest 456 by a bracket 474 which moves with the backrest 456 relative to the vertical portion 459, such that downward movement of the seat 450 with regard to the vertical portion 459 activates the suspension 66 by pulling on the first spring 170 and transfer rod 178 which also actuates the second spring 208 and damper 240 (not shown in this embodiment). The seat 450 and more particularly the backrest 456 can be connected to the vertical portion 459 in any conventional manner, such as by using a two roller/swing arm guide mechanism 476 shown in FIG. 28, or a four roller guide mechanism 478 shown in FIG. 29.

It is also to be understood that, although the foregoing description and drawings describe and illustrate in detail one or more embodiments of the present invention, to those skilled in the art to which the present invention relates, the present disclosure will suggest many modifications and constructions as well as widely differing embodiments and applications without thereby departing from the sprit and scope of the invention. The present invention, therefore, is intended to be limited only by the scope of the appended claims and the applicable prior art.

We hereby claim:

1. A vehicle seat comprising:
   a) a backrest portion;
   b) a seat portion connected to the backrest portion and having a suspension base and a seat frame; and
   c) a suspension disposed within one of the backrest portion or the seat portion, the suspension comprising:
      i) an actuating mechanism engaged with the seat;
      ii) a first force-supplying member connected between the actuating mechanism and a first anchor spaced from the actuating mechanism;
      iii) a transfer link connected to the actuating mechanism;
      iv) a second force-supplying member connected between the transfer link and a second anchor; and
      v) an adjustment mechanism moveably connected to the transfer link between the actuating mechanism and the second force-supplying member, the adjustment mechanism including a pivot pin engaged with the transfer link and moveable along the transfer link to vary the position of the pivot pin with regard to the transfer link.

2. The seat of claim 1 wherein the suspension is disposed in the seat portion.

3. The seat of claim 1 further comprising a non-adjustable rate damper connected between the transfer link and the adjustment mechanism.

4. The seat of claim 3 wherein the adjustment mechanism is movable to vary a preload, a spring rate and a damping rate for the suspension in proportion to a suspended mass on the seat.

5. The seat of claim 1 wherein the suspension includes a transfer rod connected between the actuating mechanism and the transfer link.

6. The seat of claim 5 further comprising a non-adjustable damper connected between the transfer link and the adjustment mechanism.

7. The seat of claim 6 wherein the damper is connected to the transfer link at a location spaced from the second force-supplying member.

8. The seat of claim 1 wherein the adjustment mechanism comprises a handle disposed on the exterior of the seat, and a weight adjust arm connected to the handle, to a pivot spaced from the handle and to the pivot pin opposite the handle.

9. The seat of claim 8 further comprising a damper connected to the transfer link generally opposite the second force-supplying member and to the pivot.

10. The seat of claim 8 wherein the pivot pin engages an arcuate surface on the transfer link.

11. The plate of claim 10 wherein the arcuate surface is formed by a slot disposed in the transfer link.

12. The seat of claim 8 wherein the transfer link includes a guide pin that is spaced from the pivot pin and slidably retained in a track formed on a suspension base connected to the seat portion to constrain the transfer link to rotational motion about the pivot pin.

13. The seat of claim 8 wherein the handle is engageable with a number of pairs of positioning notches disposed on the suspension base to position the pivot pin against the transfer link where desired.

14. The seat of claim 13 wherein the handle is releasably biased into engagement with the one of the pairs of notches by a third spring.

15. The seat of claim 8 wherein the handle includes a screw engaged with the weight adjust arm, and a bracket supporting the screw opposite the weight adjust arm.

16. The seat of claim 15 wherein the weight adjust arm includes an indicator secured to the weight adjust arm opposite the pivot pin.

17. The seat of claim 1 wherein the seat portion includes a cross-member engaged with the actuating mechanism.

18. The seat of claim 17 wherein the actuating mechanism is a bellcrank.

19. The seat of claim 17 wherein the cross-member is secured between a pair of linkage assemblies disposed on opposite sides of the seat portion and connected between a suspension base and a seat frame of the seat portion.

20. The seat of claim 19 wherein the linkage assemblies are scissors mechanisms.

21. The seat of claim 19 wherein the seat frame includes a pair of shafts rotatably engaged with opposite ends of the cross-member.

22. The seat of claim 21 wherein the shafts are held in engagement with the cross-member by a pair of tabs disposed at the opposite ends of the cross-member and engageable with the seat frame.

23. The seat of claim 21 wherein the shafts are held in engagement with the cross-member by a pair of cables releasably secured to the seat pan around stops on the seat frame.

24. The seat of claim 21 wherein the shafts are held in engagement with the cross-member by receiver cups positioned on opposite ends of the cross-member.

25. The seat of claim 1 wherein the first force-supplying member and second force-supplying member are springs.

26. The seat of claim 1 further comprising a linkage connected to the actuating mechanism and engaged with the seat.

27. The seat of claim 26 wherein the seat includes a roller engaged with the linkage.

28. The seat of claim 26 wherein the linkage is a ramp lever arm.

29. The seat of claim 1 further comprising a guide mechanism extending between the transfer link and the seat and used to constrain the movement of the transfer link to rotational movement about the pivot pin regardless of the position of the pivot pin along the transfer link.

30. The seat of claim 29 wherein the guide mechanism comprises:
   a) a pin connected to the transfer link; and
   b) a groove disposed on the suspension base and engaged with the pin.

31. The seat of claim 30 wherein the groove includes a first arcuate portion with a first radius and a second arcuate portion with a second radius, wherein the first radius is different than the second radius.

32. A vehicle seat comprising:
   a) a backrest portion;
   b) a seat portion connected to the backrest portion and having a suspension base and a seat frame; and
   c) a suspension disposed within one of the backrest portion or the seat portion, the suspension comprising:
      i) an actuating mechanism secured to the seat pan and engaged with the frame of the seat portion;
      ii) a first spring connected between the actuating mechanism and a first anchor spaced from the actuating mechanism;
      iii) a transfer link connected to the actuating mechanism;
      iv) a second spring connected between the transfer link and a second anchor;
      v) an adjustment mechanism moveably connected to the transfer link between the actuating mechanism and the second spring, the adjustment mechanism including a pivot pin engaged with the transfer link and moveable along the transfer link to vary the position of the pivot pin with regard to the transfer link; and
      vi) a non-adjustable rate damper connected between the transfer link and the adjustment mechanism, wherein the adjustment mechanism comprises a handle disposed on the exterior of the seat, and a weight adjust arm connected to the handle and the pivot pin opposite the handle.

33. The seat of claim 32 further comprising a guide mechanism extending between the transfer link and the seat and used to constrain the movement of the transfer link to rotational movement about the pivot pin regardless of the position of the pivot pin along the transfer link.

34. The seat of claim 32 wherein the adjustment mechanism is movable to vary a preload, a spring rate and a damping rate for the suspension in proportion to a suspended mass on the seat.

35. A suspension for a seat capable of varying the spring preload, the spring rate and the damping rate of the suspension in proportion to a suspended mass on the seat, the suspension comprising:
   i) an actuating mechanism engageable with a seat portion or backrest portion of the seat;
   ii) a first spring connectable between the actuating mechanism and the seat;
   iii) a transfer link connected at one end to the actuating mechanism;
   iv) a second spring connectable to the transfer link opposite the actuating mechanism and to the seat;
   v) an adjustment mechanism movably connectable to the seat and engageable with the transfer link between the actuating mechanism and the second spring, the adjustment mechanism including a pivot pin engaged with the transfer link and movable along the transfer link to vary the position of the pivot pin with regard to the transfer link; and
   vi) a non-adjustable rate damper having a first end connected to the transfer link and a second end connected to the adjustment mechanism.

36. The suspension of claim 35 wherein the suspension is positionable in the seat portion of the seat.

37. The suspension of claim 35 wherein the suspension is positionable in the backrest portion of the seat.

38. The suspension of claim 35 wherein the suspension is positionable on a support to which the seat is connected in a vertically movable manner.

39. The suspension of claim 35 wherein the pivot pin is engaged against a curved surface of the transfer link.

40. The suspension of claim 39 wherein the pivot pin is movable between a low weight occupant position on one side of the curved surface and a high weight occupant position on the other side of the curved surface.

* * * * *